US00RE36721E

United States Patent [19]

Akamine et al.

[11] E Patent Number: Re. 36,721

[45] Reissued Date of Patent: May 30, 2000

[54] SPEECH CODING AND DECODING APPARATUS

[75] Inventors: Masami Akamine, Yokosuka; Kimio Miseki, Kawasaki, both of Japan

[73] Assignee: Kabushiki Kaisha Toshiba, Kawasaki, Japan

[21] Appl. No.: 08/561,751

[22] Filed: Nov. 22, 1995

Related U.S. Patent Documents

Reissue of:

[64] Patent No.: 5,265,167
Issued: Nov. 23, 1993
Appl. No.: 08/013,551
Filed: Nov. 19, 1992

U.S. Applications:

[63] Continuation of application No. 07/623,648, filed as application No. PCT/JP90/00199, Feb. 20, 1990, abandoned.

[30] Foreign Application Priority Data

Apr. 25, 1989 [JP] Japan ..... 1-103398
Feb. 5, 1990 [JP] Japan ..... 2-25838

[51] Int. Cl.[7] ..... G10L 9/00

[52] U.S. Cl. ..... 704/220; 704/219; 704/223; 704/262; 704/264

[58] Field of Search ..... 395/2.22, 2.25–2.32, 395/2.35–2.37, 2.67, 2.71–2.73; 704/213, 216–223, 226–228, 258, 262–264

[56] References Cited

U.S. PATENT DOCUMENTS

| | | | |
|---|---|---|---|
| 4,736,428 | 4/1988 | Deprettere et al. | 395/2.73 |
| 4,811,396 | 3/1989 | Yatsuzuka | 395/2.39 |
| 4,864,621 | 9/1989 | Boyd | 395/2.32 |
| 4,924,508 | 5/1990 | Crepy et al. | 395/2.28 |
| 4,932,061 | 6/1990 | Kroon et al. | 395/2.32 |
| 4,944,013 | 7/1990 | Gouvianakis et al. | 395/2.28 |
| 4,964,169 | 10/1990 | Ono | 395/2.27 |
| 5,060,268 | 10/1991 | Asakawa et al. | 395/2.28 |

OTHER PUBLICATIONS

ICASSP '89, Glasgow, 23–26 May 1989, V1 pp. 148–151, IEEE, NY Akamine et al "ARMA model based Speech Coding at 8KB/S".

EUROCON '88, Stockholm, 13–17 Jun., 1988, pp. 24–27, IEEE, NY Lever et al; "RPCELP: A high quality and low complexity scheme for narrow band coding of speech".

ICASSP '85, Tampa, Fla, 26–29 Mar. 85, V4, pp. 1429–1432 IEEE NY, Wake et al, "A multple LPC speech codec using DSP".

ICDSC–7 (7th Intl. Conf. on Digital Satellite Comm), Munich, 12–16 May 86 pp. 785–790, VDE–Verlag GmbH, Berlin, DE. Araseki et al, "A high quality multi pulse LPC Coder for Speech trans. below 16 KBPS".

(List continued on next page.)

*Primary Examiner*—Kee M. Tung
*Attorney, Agent, or Firm*—Oblon, Spivak, McClelland, Maier & Neustadt, P. C.

[57] ABSTRACT

A speech signal is input to an excitation signal generating section, a prediction filter and a prediction parameter calculator. The prediction parameter calculator calculates a predetermined number of prediction parameters (LPC parameter or reflection coefficient) by an autocorrelation method or covariance method, and supplies the acquired prediction parameters to a prediction parameter coder. The codes of the prediction parameters are sent to a decoder and a multiplexer. The decoder sends decoded values of the codes of the prediction parameters to the prediction filter and the excitation signal generating section. The prediction filter calculates a prediction residual signal, which is the difference between the input speech signal and the decoded prediction parameter, and sends it to the excitation signal generating section. The excitation signal generating section calculates the pulse interval and amplitude for each of a predetermined number of subframes based on the input speech signal, the prediction residual signal and the quantized value of the prediction parameter, and sends them to the multiplexer. The multiplexer combines these codes and the codes of the prediction parameters, and send the results as an output signal of a coding apparatus to a transmission path or the like.

36 Claims, 27 Drawing Sheets

OTHER PUBLICATIONS

IEEE Trans. ASSP–34, pp. 1034–1063, "RPE–A novel Approach to effective and Efficient Multipulse Coding of Speech." Kroon et al. Oct. 1986.

IEEE, ICASSP '85, pp. 937–940, "CELP–high quality speech a very low bid rates", Atal et al, 1985.

"High Quality Audio Coding Using Multi–pulse LPC " by Sharad Singhal, ICASSP '99: Acoustics, Speech & Signal Processing Conference, 1990.

SPEECH CODING AND DECODING APPARATUS

Matter enclosed in heavy brackets [ ] appears in the original patent but forms no part of this reissue specification; matter printed in italics indicates the additions made by reissue.

This application is a continuation of application Ser. No. 07/623,648, filed on Dec. 26, 1990, filed as PCT/JP90/00199, Feb. 20, 1990, published as WO90/13112, Nov. 1, 1990, now abandoned.

TECHNICAL FIELD

The present invention relates to a speech coding apparatus which compresses a speech signal with a high efficiency and decodes the signal. More particularly, this invention relates to a speech coding apparatus based on a train of adaptive density excitation pulses and whose transfer bit rate can be set low, e.g., to 10 Kb/s or lower.

BACKGROUND ART

Todays, coding technology for transferring a speech signal at a low bit rate of 10 Kb/s or lower has been extensively studied. As a practical method is known using a system in which an excitation signal of a speech synthesis filter is represented by a train of pulses aligned at predetermined intervals and the excitation signal is used for coding the speech signal. The details of this method are explained in the paper titled "Regular-Pulse Excitation—A Novel Approach to Effective and Efficient Multipulse Coding of Speech," written by Peter Kroon et al. in the IEEE Report, October 1986, Vol. ASSP-34, pp. 1054–1063 (Document 1).

The speech coding system disclosed in this paper will be explained referring to FIGS. 1 and 2, which are block diagrams of a coding apparatus and a decoding apparatus of this system.

Referring to FIG. 1, an input signal to a prediction filter 1 is a speech signal series s(n) undergone A/D conversion. The prediction filter 1 calculates a prediction residual signal r(n) expressed by the following equation using an old series of s(n) and a prediction parameter $a_i$ ($1 \leqq i \leqq p$), and outputs the residual signal.

$$r(n) = s(n) - \sum_{i=1}^{p} a_i \cdot s(n-i) \tag{1}$$

where p is an order of the filter 1 and p=12 in the aforementioned paper. A transfer function A(z) of the prediction filter 1 is expressed as follows:

$$A(z) = 1 - \sum_{K=1}^{p} a_k \cdot Z^{-K} \tag{2}$$

An excitation signal generator 2 generates a train of excitation pulses V(n) aligned at predetermined intervals as an excitation signal. FIG. 3 exemplifies the pattern of the excitation pulse train V(n). K in this diagram denotes the phase of a pulse series, and represents the position of the first pulse of each frame. The horizontal scale represents a discrete time. Here, the length of one frame is set to 40 samples (5 ms with a sampling frequency of 8 KHz), and the pulse interval is set to 4 samples.

A subtracter 3 calculates the difference e(n) between the prediction residual signal r(n) and the excitation signal V(n), and outputs the difference to a weighting filter 4. This filter 4 serves to shape the difference signal e(n) in a frequency domain in order to utilize the masking effect of audibility, and its transfer function W(z) is given by the following equation:

$$W(z) = 1/A(z/r) = 1/\left(1 - \sum_{K=1}^{p} a_K \cdot r^K \cdot Z^{-K}\right) \quad (0 \leqq r \leqq 1) \tag{3}$$

As the weighting filter and the masking effect are described in, for example, "Digital Coding of Waveforms" written by N. S. Tayant and P. Noll, issued in 1984 by Prentice-Hall (Document 2), their description will be omitted here.

The error e'(n) weighted by the weighting filter 4 is input to an error minimize circuit 5, which determines the amplitude and phase of the excitation pulse train so as to minimize the squared error of e'(n). The excitation signal generator 2 generates an excitation signal based on these amplitude and phase information. These amplitude and face information are output from an output terminal 6a. How to determine the amplitude and phase of the excitation pulse train in the error minimize circuit 5 will now briefly be described according to the description given in the document 1.

First, with the frame length set to L samples and the number of excitation pulses in one frame being Q, the matrix Q×L representing the positions of the excitation pulses is denoted by $M_K$. The elements $m_{ij}$ of $M_K$ are expressed as follows; K is the phase of the excitation pulse train.

$$m_{ij}=1 \quad \text{for } j=i\times N+K-1, \qquad m_{ij}=0 \quad \text{for } j\neq i\times N+K-1 \tag{4}$$

where $$0 \leqq i \leqq Q\times 1, \quad 0 \leqq j \leqq L-1, \quad (N=L/Q)$$

Given that $b^{(K)}$ is a row vector having non-zero amplitudes of the excitation signal (excitation pulse train) with the phase K as elements, a row vector $u^{(K)}$ which represents the excitation signal with the phase K is given by the following equation.

$$u^{(K)}=b^{(K)}M_K \tag{5}$$

The following matrix L×L having impulse responses of the weighting filter 4 as elements is denoted by H.

$$H = \begin{bmatrix} h(0) & h(1) & \cdots & h(L-1) \\ 0 & h(0) & \cdots & h(L-2) \\ 0 & 0 & \cdots & h(L-3) \\ \vdots & \vdots & & \vdots \\ 0 & 0 & \cdots & h(0) \end{bmatrix} \quad (6)$$

At this time, the error vector $e^{(K)}$ having the weighted error e'(n) as an element is expressed by the following equation:

$$e^{(K)}=e^{(0)}-b^{(K)} \quad (7)$$

(K=1, 2, . . . N)
where $$e^{(0)}=e_0+r\times H \quad (8)$$

$$H_K=M_K H \quad (9)$$

The vector $e_0$ is the output of the weighting filter according to the internal status of the weighting filter in the previous frame, and the vector r is a prediction residual signal vector. The vector $b^{(K)}$ representing the amplitude of the proper excitation pulse is acquired by obtaining a partial derivative of the squared error, expressed by the following equation, $$E=e^{(K)}e^{(K)}t \quad (10)$$

with respect to $b^{(K)}$ and setting it to zero, as given by the following equation.

$$b^{(K)}=e^{(0)}H_K^t[H_K H_K^t]^{-1} \quad (11)$$

Here, with the following equation calculated for each K, the phase K of the excitation pulse train is selected to minimize $E^{(K)}$.

$$E^{(K)}=e^{(0)}[H_K^t[H_K H_K^t]^{-1}H_K]e^{(0)t} \quad (12)$$

The amplitude and phase of the excitation pulse train are determined in the above manner.

The decoding apparatus shown in FIG. 2 will now be described. Referring to FIG. 2, an excitation signal generator 7, which is the same as the excitation signal generator 2 in FIG. 1, generates an excitation signal based on the amplitude and phase of the excitation pulse train which has been transferred from the coding apparatus and input to an input terminal 6b. A synthesis filter 8 receives this excitation signal, generates a synthesized speech signal s(n), and sends it to an output terminal 9. The synthesis filter 8 has the inverse filter relation to the prediction filter 1 shown in FIG. 1, and its transfer function is 1/A(z).

In the above-described conventional coding system, information to be transferred is the parameter $a_i$ ($1 \leqq i \leqq p$) and the amplitude and phase of the excitation pulse train, and the transfer rate can be freely set by changing the interval of the excitation pulse train, N=L/Q. However, the results of the experiments by this conventional system show that when the transfer rate becomes low, particularly, 10 Kb/s or below, noise in the synthesized sound becomes prominent, deteriorating the quality. In particular, the quality degradation is noticeable in the experiments with female voices with short pitch.

This is because that the excitation pulse train is always expressed by a train of pulses having constant intervals. In other words, as a speech signal for a voiced sound is a pitch-oriented periodic signal, the prediction residual signal is also a periodic signal whose power increases every pitch period. In the prediction residual signal with periodically increasing power, that portion having large power contains important information. In that portion where the correlation of the speech signal changes in accordance with degradation of reverberation, or that part at which the power of the speech signal increases, such as the voicing start portion, the power of the prediction residual signal also increases in a frame In this case too, a large-power portion of the prediction residual signal is where the property of the speech signal has changed, and is therefore important.

According to the conventional system, however, even though the power of the prediction residual signal changes within a frame, the synthesis filter is excited by an excitation pulse train always having constant intervals in a frame to acquire a synthesized sound, thus significantly degrading the quality of the synthesized sound.

As described above, since the conventional speech coding system excites the synthesis filter by an excitation pulse train always having constant intervals in a frame, the transfer rate becomes low, 10 Kb/s or lower, for example, the quality of the synthesized sound is deteriorated.

SUMMARY OF THE INVENTION

With this shortcoming in mind, it is an object of the present invention to provide a speech coding apparatus capable of providing high-quality synthesized sounds even at a low transfer rate.

According to the present invention, in a speech coding apparatus for driving a synthesis filter by an excitation signal to acquire a synthesized sound, the frame of the excitation signal is divided into plural subframes of an equal length or different lengths, a pulse interval is variable subframe by subframe, the excitation signal is formed by a train of excitation pulses with equal intervals in each subframe, the amplitude or the amplitude and phase of the excitation pulse train are determined so as to minimize power of an error signal between an input speech signal and an output signal of the synthesis which is excited by the excitation signal, and the density of the excitation pulse train is determined on the basis of a short-term prediction residual signal or a pitch prediction residual signal to the input speech signal.

According to the present invention, the density or the pulse interval of the excitation pulse train is properly varied in such a way that it becomes dense in those subframes containing important information or many pieces of information and becomes sparse other subframes, thus improving the quality of the synthesized sound.

BEST MODES OF CARRYING OUT THE INVENTION

Preferred embodiment of a speech coding apparatus according to the present invention will now be described referring to the accompanying drawings.

Figure 4:
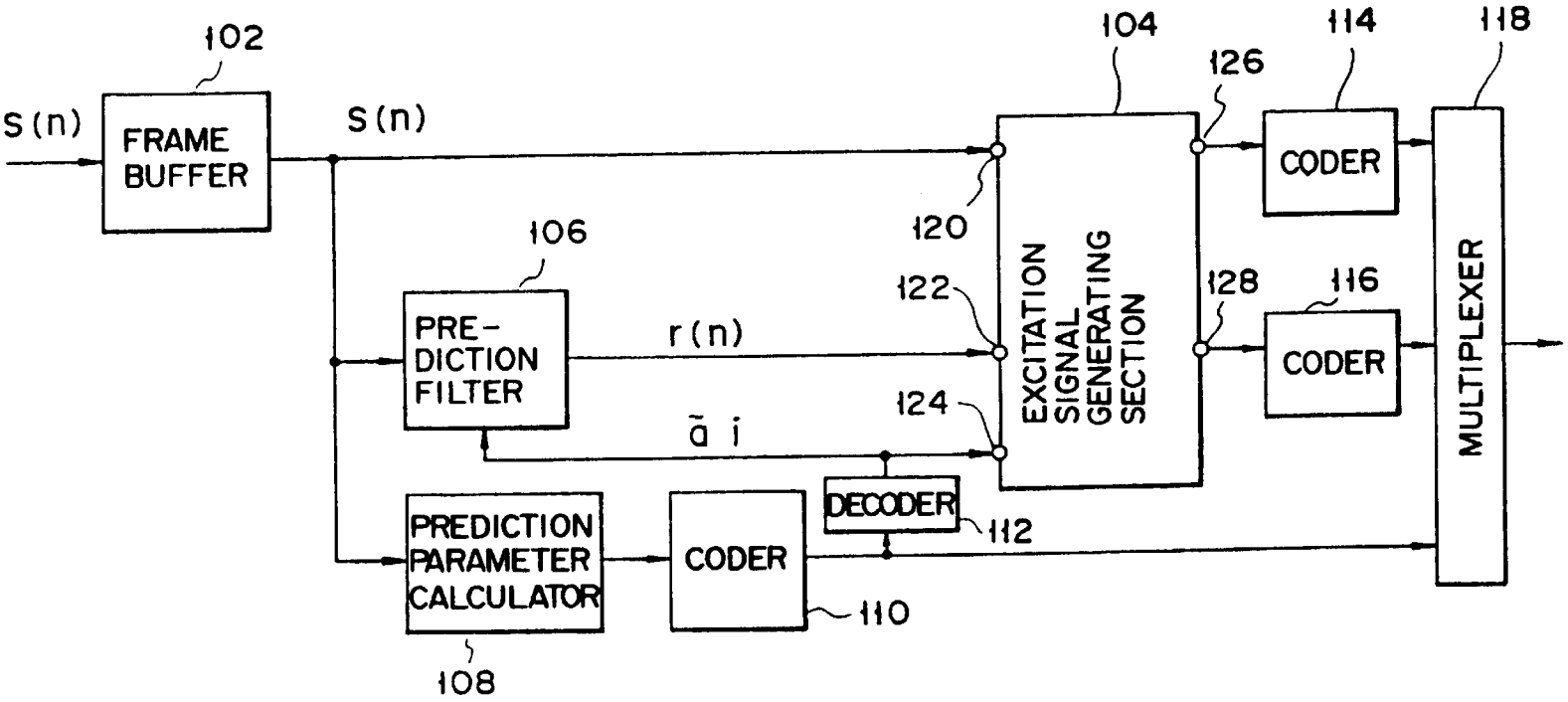
FIG. 4 is a block diagram illustrating the structure of a coding apparatus according to the first embodiment of a speech coding apparatus of the present invention.

FIG. 4 is a block diagram showing a coding apparatus according to the first embodiment. A speech signal s(n) after A/D conversion is input to a frame buffer 102, which accumulates the speech signal s(n) for one frame. Individual elements in FIG. 4 perform the following processes frame by frame.

A prediction parameter calculator 108 receives the speech signal s(n) from the frame buffer 102, and computes a predetermined number, p, of prediction parameters (LPC parameter or reflection coefficient) by an autocorrelation method or covariance method. The acquired prediction parameters are sent to a prediction parameter coder 110, which codes the prediction parameters based on a predetermined number of quantization bits, and outputs the codes to a decoder 112 and a multiplexer 118. The decoder 112 decodes the received codes of the prediction parameters and sends decoded values to a prediction filter 106 and an excitation signal generator 104. The prediction filter 106 receives the speech signal s(n) and an $\alpha$ parameter $\alpha_i$, for example, as a decoded prediction parameter, calculates a prediction residual signal r(n) according to the following equation, then sends r(n) to the excitation signal generating section 104.

$$r(n) = s(n) - \sum_{i=1}^{p} \bar{a}_i \cdot s(n-i) \tag{13}$$

An excitation signal generating section 104 receives the input signal s(n), the prediction residual signal r(n), and the quantized value $a_i(1 \leqq i \leqq p)$ of the LPC parameter, computes the pulse interval and amplitude for each of a predetermined number, M, of subframes, and sends the pulse interval via an output terminal 126 to a coder 114 and the pulse amplitude via an output terminal 128 to a coder 116.

The coder 114 codes the pulse interval for each subframe by a predetermined number of bits, then sends the result to the multiplexer 118. There may be various methods of coding the pulse interval. As an example, a plurality of possible values of the pulse interval are determined in advance, and are numbered, and the signals are treated as codes of the pulse intervals.

The coder 116 encodes the amplitude of the excitation pulse in each subframe by a predetermined number of bits, then sends the result to the multiplexer 116. There may also be various ways to code the amplitude of the excitation pulse; a conventionally well-known method can be used. For instance, the probability distribution of normalized pulse amplitudes may be checked in advance, and the optimal quantizer for the probability distribution (generally called quantization of MAX). Since this method is described in detail in the aforementioned document 1, etc., its explanation will be omitted here. As another method, after normalization of the pulse amplitude, it may be coded using a vector quantization method. A code book in the vector quantization may be prepared by an LBG algorithm or the like. As the LBG algorithm is discussed in detail in the paper title "An Algorithm for Vector Quantizer Design," by Yoseph Lindle, the IEEE report, January 1980, vol. 1, COM-28, pp. 84–95 (Document 3), its description will be omitted here.

With regard to coding of an excitation pulse series and coding of prediction parameters, the method is not limited to the above-described methods, and a well-known method can be used.

The multiplexer 118 combines the output code of the prediction parameter coder 110 and the output codes of the coders 114 and 116 to produce an output signal of the coding apparatus, and sends the signal through an output terminal to a communication path or the like.

Figure 5:
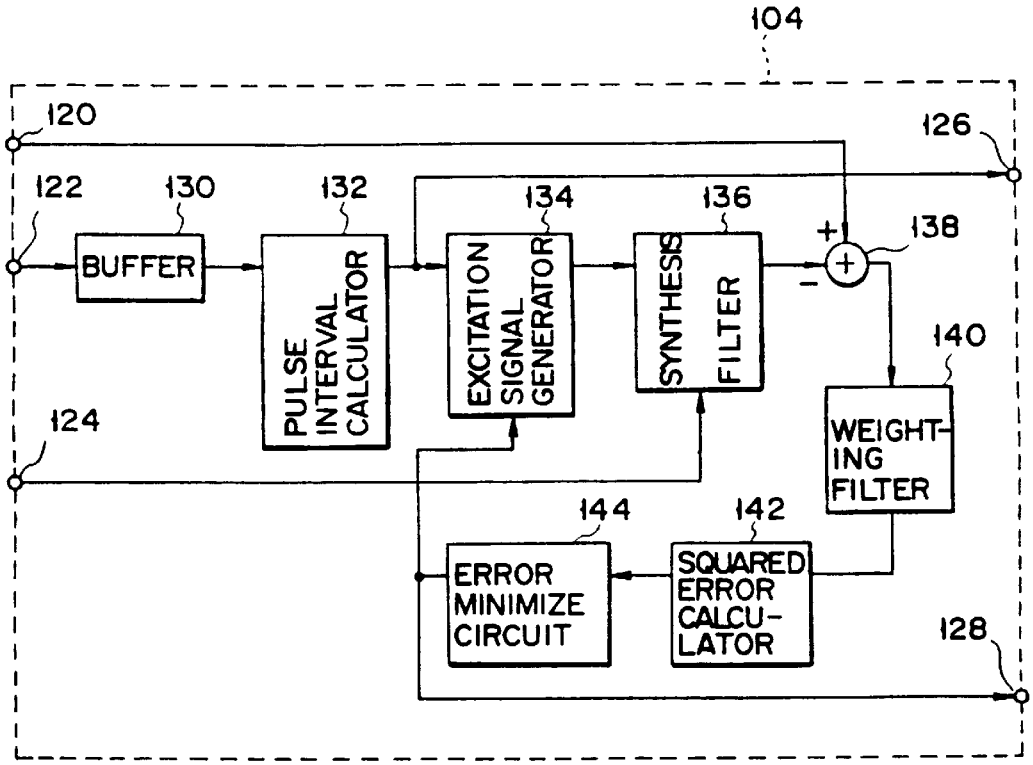
FIG. 5 is a detailed block diagram of an excitation signal generating section in FIG. 4.

Now, the structure of the excitation signal generating section 104 will be described. FIG. 5 is a block diagram exemplifying the excitation signal generator 104. Referring to this diagram, the prediction residual signal r(n) for one frame is input through a terminal 122 to a buffer memory 130. The buffer memory 130 divides the input prediction residual signal into predetermined M subframes of equal length or different lengths, then accumulates the signal for each subframe. A pulse interval calculator 132 receives the prediction residual signal accumulated in the buffer memory 130, calculates the pulse interval for each subframe according to a predetermined algorithm, and sends it to an excitation signal generator 134 and the output terminal 126.

There may be various algorithms for calculating the pulse interval For instance, two types of values N1 and N2 may be set as the pulse interval in advance, and the pulse interval for a subframe is set to N1 when the square sum of the prediction residual signal of the subframe is greater than a threshold value, and to N2 when the former is smaller than the latter. As another method, the square sum of the prediction residual signal of each subframe is calculated, and the pulse interval of a predetermined number of subframes in the order from a greater square sum is set to N1, with the pulse interval of the remaining subframes being set to N2.

The excitation signal generator 134 generates an excitation signal V(n) consisting of a train of pulses having equal intervals subframe by subframe based on the pulse interval from the pulse interval calculator 132 and the pulse amplitude from an error minimize circuit 144, and sends the signal to a synthesis filter 136. The synthesis filter 136 receives the excitation signal V(n) and a prediction parameter $\tilde{a}_i$ ($1 \leqq i \leqq p$) through a terminal 124, calculates a synthesized signal $\tilde{s}(n)$ according to the following equation, and sends $\tilde{s}(n)$ to a subtracter 138.

$$\tilde{s}(n) = V(n) + \sum_{i=1}^{p} \tilde{a}_i \cdot \tilde{s}(n-i) \tag{14}$$

The subtracter 138 calculates the difference e(n) between the input speech signal from a terminal 120 and the synthesized signal, and sends it to a perceptional weighting filter 140. The weighting filter 140 weights e(n) on the frequency axis, then outputs the result to a squared error calculator 142.

The transfer function of the weighting filter 140 is expressed as follows using the prediction parameter $\tilde{a}_i$ from the synthesis filter 136.

$$W(z) = \left(1 - \sum_{i=1}^{p} \tilde{a}_i \cdot z^{-1}\right) \Big/ \left(1 - \sum_{i=1}^{p} \tilde{a}_i \cdot \gamma^i \cdot z^{-1}\right) \tag{15}$$

where $\gamma$ is a parameter to give the characteristic of the weighting filter.

This weighting filter, like the filter 4 in the prior art, utilizes the masking effect of audibility, and is discussed in detail in the document 1.

The squared error calculator 142 calculates the square sum of the subframe of the weighted error e'(n) and sends it to the error minimize circuit 144. This circuit 144 accumulates the weighted squared error calculated by the squared error calculator 144 and adjusts the amplitude of the excitation pulse, and sends amplitude information to the excitation signal generator 134. The generator 134 generates the excitation signal V(n) again based on the information of the interval and amplitude of the excitation pulse, and sends it to the synthesis filter 136.

The synthesis filter 136 calculates a synthesized signal $\tilde{s}(n)$ using the excitation signal V(n) and the prediction parameter $\tilde{a}_i$, and outputs the signal $\tilde{s}(n)$ to the subtracter 138. The error e(n) between the input speech signal s(n) and the synthesized signal $\tilde{s}(n)$ acquired by the subtracter 138 is weighted on the frequency axis by the weighting filter 140, then output to the squared error calculator 142. The squared error calculator 142 calculates the square sum of the subframe of the weighted error and sends it to the error minimize circuit 144. This error minimize circuit 144 accumulates the weighted squared error again and adjusts the amplitude of the excitation pulse, and sends amplitude information to the excitation signal generator 134.

The above sequence of processes from the generation of the excitation signal to the adjustment of the amplitude of the excitation pulse by error minimization is executed subframe by subframe for every possible combination of the amplitudes of the excitation pulse, and the excitation pulse amplitude which minimizes the weighted squared error is sent to the output terminal 128. In the sequence of processes, it is necessary to initialize the internal statuses of the synthesis filter and weighting filter every time the adjustment of the amplitude of the excitation pulse is completed.

According to the first embodiment, as described above, the pulse interval of the excitation signal can be changed subframe by subframe in such a wa that it becomes dense for those subframes containing important information or many pieces of information and becomes sparse for the other subframes.

Figure 6:
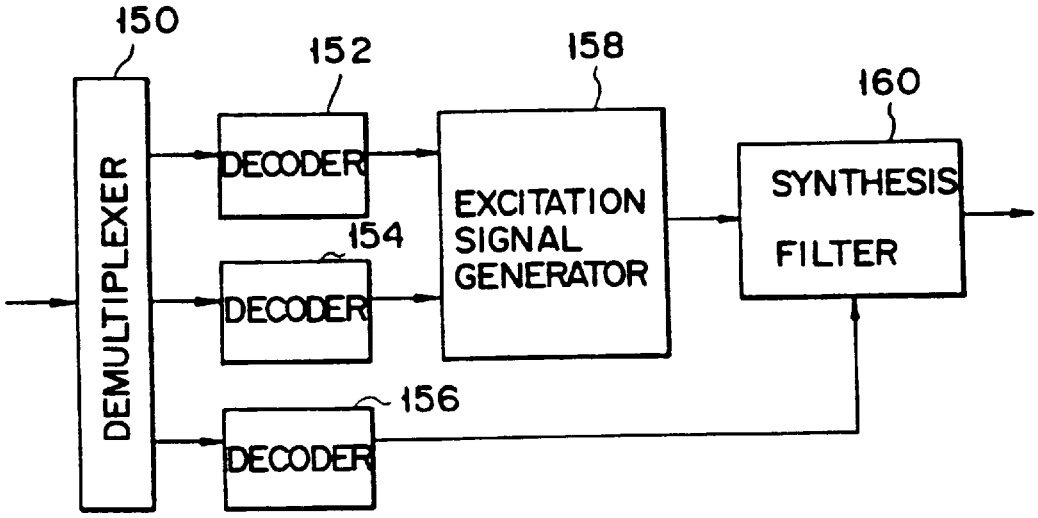
FIG. 6 is a block diagram illustrating the structure of a decoding apparatus according to the first embodiment.

A decoding apparatus according to the first embodiment will now be described. FIG. 6 is a block diagram of the apparatus. A code acquired by combining the code of the excitation pulse interval, the code of the excitation pulse amplitude, and the code of the prediction parameter, which has been transferred through a communication path or the like from the coding apparatus, is input to a demultiplexer 150. The demultiplexer 150 separates the input code into the code of the excitation pulse interval, the code of the excitation pulse amplitude, and the code of the prediction parameter, and sends these codes to decoders 152, 154 and 156.

The decoder 152 and 154 each decode the received code into an excitation pulse interval $N_m$ ($1 \leqq m \leqq M$, $1 \leqq i \leqq Q_m$, $Q_m = L/N_m$), and send it to an excitation signal generator 158. The decoding procedure is the inverse of what has been done in the coders 114 and 116 explained with reference to FIG. 4. The decoder 156 decodes the code of the prediction parameter into $\tilde{a}_i$ ($1 \leqq i \leqq p$), and sends it to a synthesis filter 160. The decoding procedure is the inverse of what has been done in the coder 110 explained with reference to FIG. 4.

The excitation signal generator 158 generates an excitation signal V(j) consisting of a train of pulses having equal intervals in a subframe but different intervals from one subframe to another based on the information of the received excitation pulse interval and amplitude, and sends the signal to a synthesis filter 160. The synthesis filter 160 calculates a synthesized signal y(j) according to the following equation using the excitation signal V(j) and the quantized prediction parameter $\tilde{a}_i$, and outputs it.

$$y(j) = V(j) + \sum_{i=1}^{p} \bar{a}_i \cdot y(j-1) \quad (16)$$

$$(j = 1, 2, \ldots N)$$

Now the second embodiment will be explained. Although the excitation pulse is computed by the A-b-S (Analysis by Synthesis) method in the first embodiment, the excitation pulse may be analytically calculated as another method.

Here, first, let N (samples) be the frame length, M be the number of subframes, L (samples) be the subframe length, $N_m$ ($1 \leqq m \leqq M$) be the interval of the excitation pulse in the m-th subframe, $Q_m$ be the number of excitation pulses, $g_i^{(m)}$ ($1 \leqq i \leqq Q_m$) be the amplitude of the excitation pulse, and $K_m$ be the phase of the excitation pulse. Here there is the following relation.

$$Q_m = \lfloor L/N_m \rfloor \quad (17)$$

where $\lfloor \cdot \rfloor$ indicates computation to provide an integer portion by rounding off.

Figure 7:
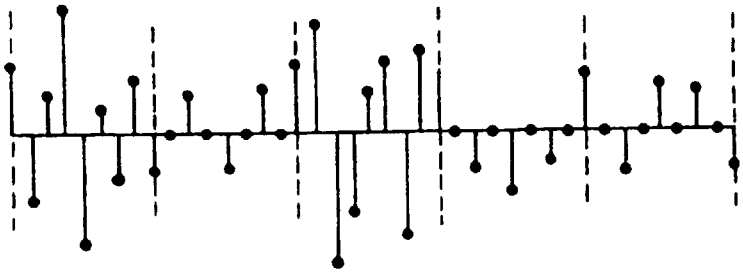
FIG. 7 is a diagram exemplifying an excitation signal which is generated in the second embodiment of the present invention.

FIG. 7 illustrates an example of the excitation signal in a case where M=5, L=8, $N_1=N_3=1$, $N_2=N_4=N_5=2$, $Q_1=Q_3=8$, $Q_2=Q_4=Q_5=4$, and $K_1=K_2=K_3=K_4=1$. Let $V^{(m)}(n)$ be the excitation signal in the m-th subframe. Then, $V^{(m)}(n)$ is given by the following equation.

$$V^m(n) = \sum_{i=1}^{Q_m} g_i^{(m)} \delta(n-1) \quad (18)$$

$$(n = 1, 2, \ldots L)$$

$$i = (i-1)N_m + K_m \quad (19)$$

$$(i \leqq K_m \leqq N_m)$$

where δ (·) is a Kronecker delta function.

With h(n) being the impulse response of the synthesis filter 136, the output of the synthesis filter 136 is expressed by the sum of the convolution sum of the excitation signal and the impulse response and the filter output according to the internal status of the synthesis filter in the previous frame. The synthesized signal $y^{(m)}(n)$ in the m-th subframe can be expressed by the following equation.

$$y^{(m)}(n) = y_o\{n + (m-1)L\} + \sum_{j=1}^{m} V^{(j)}(n) * h\{n + (m-1)L\} \quad (20)$$

where * represents the convolution sum. $y_o$ (j) is the filter output according to the last internal status of the synthesis filter in the previous frame, and with $y_{OLD}(j)$ being the output of the synthesis filter of the previous frame, $y_o(j)$ is expressed as follows.

$$y_o(j) = \sum_{i=1}^{p} \bar{a}_i \cdot y_o(j-1) \quad (21)$$

$$(j = 1, 2, \ldots N)$$

where the initial status of $y_o$ are $y_o(0)=y_{OLD}(N)$, $y_o(-1)=y_{OLD}(N-1)$, and $y_o(-i)=y_{OLD}(N-i)$.

With Hw(z) being a transfer function of a cascade-connected filter of the synthesis filter 1/A(z) and the weighting filter W(z), and hw(z) being its impulse response, $\hat{y}^{(m)}(n)$ of the cascade-connected filter in a case of $V^{(m)}(n)$ being an excitation signal is written by the following equation.

$$\hat{y}^{(m)}(n) = y_o\{n + (m-1)L\} + \sum_{j=1}^{m} \sum_{i=1}^{L} V^{(j)}(i) hw(n - i + (m-j)L\} \quad (22)$$

$$(n = 1, 2, \ldots L)$$

Here, $$\hat{y}_o(j) = \sum_{i=1}^{p} a_i \cdot \gamma^i \cdot y_o(j-1) \quad (23)$$

$$(j = 1, 2, \ldots N)$$

The initial statuses are represented by follows:

$$\begin{aligned} \hat{y}_o(0) &= \hat{y}_{OLD}(N), \hat{y}_o(-1) \\ &= \hat{y}_{OLD}(N-1), \ldots \hat{y}_o(-1) \\ &= \hat{y}_{OLD}(N-1) \end{aligned} \quad (24)$$

$$\begin{aligned} Hw(z) &= \{1/A(z)\} \cdot \{A(z)/A(z/r)\} \\ &= 1/A(z/r) \\ &= 1 \Big/ \left(1 - \sum_{i=1}^{p} \bar{a}_i \cdot \gamma^i \cdot z^{-1}\right) \end{aligned} \quad (25)$$

$$hw(n) = \sum_{i=1}^{p} \bar{a}_i \cdot \gamma^i \cdot hw(n-1) + \delta(o) \quad (26)$$

At this time, the weightinged error $e^{(m)}(n)$ between the input speech signal s(n) and the synthesized signal $y^{(m)}(n)$ is expressed as follows.

$$\begin{aligned} e^{(m)}(n) &= Sw\{n + (m-1)L\} \\ &= \hat{y}^{(m)}(n) \end{aligned} \quad (27)$$

where Sw(n) is the output of the weighting filter when the input speech signal S(n) is input to the weighting filter.

The square sum J of the subframe of the weighted error can be written as follows using the equations (18), (19), (22) and (27).

$$\begin{aligned} J &= \sum_{n=1}^{L} \left[ x\{n + (m-1)L\} - \sum_{j=1}^{m} \sum_{i=1}^{L} V^{(j)}(i) hw\{n - i + (m-j)\} \right]^2 \\ &= \sum_{n=1}^{L} \left[ x\{n + (m-1)L\} - \sum_{j=1}^{m} \sum_{i=1}^{Q_i} gi^{(j)} hw\{n - i + (m-j)L\} \right]^2 \end{aligned} \quad (28)$$

where, $$l = (i-1)Nm + Km \quad (29)$$

$$xj = Sw(j) - y_o(j) \quad (30)$$

(j=1, 2, . . . N)

Partially differentiating the equation (28) with respect to $gi^{(m)}$ and setting it to 0 yields the following equation.

$$\sum_{j=1}^{Q_m} gi^{(m)}\psi_{hh}\{(i-1)N_m+K_m,\ (j-1)N_m+K_m\}^{(m)} = \psi_{hh}\{(i-1)N_m+K_m\} - \sum_{j=1}^{m=1}\sum_{k=1}^{\partial j} gk^{(j)}\psi_{hh}\{(j-1)L+K_j,\ m\cdot L+(i-1)N_m+K_m\} \quad (31)$$

This equation is simultaneous linear equations of the $Q_m$ order with the coefficient matrix being a symmetric matrix, and can be solved in the order of $Qm^3$ by the Cholesky factorizing. In the equation, $\psi_{hh}(i, j)$ and $\overline{\psi}_{hh}(i, j)$ represent mutual correlation coefficients of hw(n), and ψxh(i), which represents an autocorrelation coefficient of x(n) and hw(n) in the m-th subframe, is expressed as follows. As $\psi_{hh}(i, j)$ and $\overline{\psi}_{hh}(i, j)$ are both often called covariance coefficients in the filed of the speech signal processing, they will be called so here.

$$\phi_{hh}(i, j)=\Sigma hw(n-i)hw(n-j) \quad (32)$$

$(1 \leqq j \leqq L)$ $$\overline{\phi}_{hh}(i, j)=\Sigma hw(n-i)hw(n-j) \quad (33)$$

$(1 \leqq i(M-1)L,\ 1 \leqq j \leqq L)$ $$\phi_{hx}^{(m)}(i)=\Sigma x(n)hw\{(n-i-(m-1)L\} \quad (34)$$

$(1 \leqq j \leqq L)$

The amplitude $g_i^{(m)}$ $(1 \leqq i \leqq Qm)$ of the excitation pulse with the phase being $K_m$ is acquired by solving the equation (31). With the pulse amplitude acquired for each value of $K_m$ and the weighted squared error at that time calculated, the phase $K_m$ can be selected so as to minimize the error.

Figure 8:
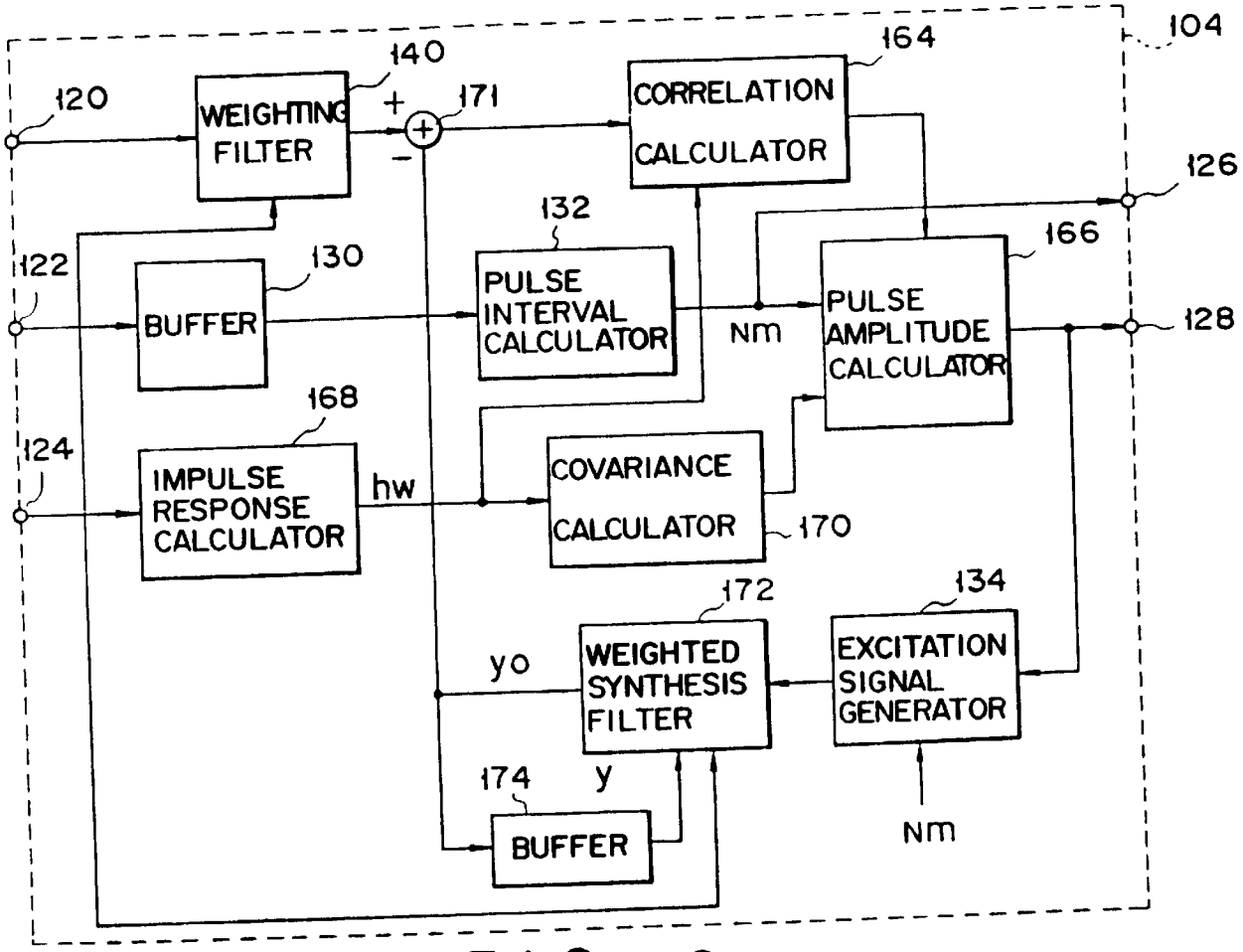
FIG. 8 is a detailed block diagram of an excitation signal generating section in a coding apparatus according to the second embodiment.

FIG. 8 presents a block diagram of the excitation signal generator 104 according to the second embodiment using the above excitation pulse calculating algorithm. In FIG. 8, those portions identical to what is shown in FIG. 5 are given the same reference numerals, thus omitting their description.

An impulse response calculator 168 calculates the impulse response hw(n) of the cascade-connection of the synthesis filter and the weighting filter for a predetermined number of samples according to the equation (26) using the quantized value $\tilde{a}_i$ of the prediction parameter input through the input terminal 124 and a predetermined parameter γ of the weighting filter. The acquired hw(n) is sent to a covariance calculator 170 and a correlation calculator 164. The covariance calculator 164 receives the impulse response series hw(n) and calculates covariances $\psi_{hh}(i, j)$ and $\psi_{hh}(i, j)$ of hw(n) according to the equations (32) and (31), then sends them to a pulse amplitude calculator 166. A subtracter 171 calculates the difference x(j) between the output Sw(j) of the weighting filter 140 and the output $y_o(j)$ of the weighted synthesis filter 172 for one frame according to the equation (30), and sends the difference to the correlation calculator 164.

The correlation calculator 164 receives x(j) and hw(n), calculates the correlation $\psi_{xh}^{(m)}(i)$ of x and hw according to the equation (34), and sends the correlation to the pulse amplitude calculator 166. The calculator 166 receives the pulse interval $N_m$ calculated by, and output from, the pulse interval calculator 132, correlation coefficient $\psi_{xh}^{(m)}(i)$, and covariances $\psi_{hh}(i, j)$ and $\overline{\psi}_{hh}(i, j)$ solves the equation (31) with predetermined L and Km using the Cholesky factorizing or the like to thereby calculate the excitation pulse amplitude $g_i^{(m)}$, and sends $g_i^{(m)}$ to the excitation signal generator 134 and the output terminal 128 while storing the pulse interval $N_m$ and amplitude $gi^{(m)}$ into the memory.

The excitation signal generator 134, as described above, generates an excitation signal consisting of a pulse train having constant intervals in a subframe based on the information $N_m$ and $g_i^{(m)}$ $(1 \leqq m \leqq M,\ 1 \leqq i \leqq Q_m)$ of the interval and amplitude of the excitation pulse for one frame, and sends the signal to the weighted synthesis filter 172. This filter 172 accumulates the excitation signal for one frame into the memory, and calculates $y_o(j)$ according to the equation (23) using the output $\hat{y}_{OLD}$ of the previous frame accumulated in the buffer memory 130, the quantized prediction parameter $\tilde{a}_i$, and a predetermined γ, and sends it to the subtracter 171 when the calculation of the pulse amplitudes of all the subframes is not completed. When the calculation of the pulse amplitude of every subframe is completed, the output ŷ(j) is calculated according to the following equation using the excitation signal V(j) for one frame as the input signal, then is output to the buffer memory 340.

$$\hat{y}(j) = V(j) + \sum_{i=1}^{p} \tilde{a}_i \cdot \gamma^i \cdot \hat{y}(j-1) \quad (35)$$

$(j = 1, 2, \ldots N)$

The buffer memory 130 accumulates p number of ŷ(N), ŷ(N−1), . . . ŷ(N−p+1).

The above sequence of processes is executed from the first subframe (m=1) to the last subframe (m=M).

According to the second embodiment, since the amplitude of the excitation pulse is analytically acquired, the amount of calculation is remarkably reduced as compared with the first embodiment shown in FIG. 5.

Although the phase $K_m$ of the excitation pulse is fixed in the second embodiment shown in FIG. 7, the optimal value may be acquired with $K_m$ set variable for each subframe, as described above. In this case, there is an effect of providing a synthesized sound with higher quality.

The above-described first and second embodiments may be modified in various manners. For instance, although the coding of the excitation pulse amplitudes in one frame is done after all the pulse amplitudes are acquired in the foregoing description, the coding may be included in the calculation of the pulse amplitudes, so that the coding would be executed every time the pulse amplitudes for one subframe are calculated, followed by the calculation of the amplitudes for the next subframe. With this design, the pulse amplitude which minimizes the error including the coding error can be obtained, presenting an effect of improving the quality.

Although a linear prediction filter which remove an approximated correlation is employed as the prediction filter, a pitch prediction filter for removing a long-term correlation and the linear prediction filter may be cascade-connected instead and a pitch synthesis filter may be included in the loop of calculating the excitation pulse amplitude. With this design, it is possible to eliminate the strong correlation for every pitch period included in a speech signal, thus improving the quality.

Further, although the prediction filter and synthesis filter used are of a full pole model, filters of a zero pole model may be used. Since the zero pole model can better express the zero points existing in the speech spectrum, the quality can be further improved.

In addition, although the interval of the excitation pulse is calculated on the basis of the power of the prediction residual signal, it may be calculated based on the mutual correlation coefficient between the impulse response of the synthesis filter and the prediction residual signal and the autocorrelation coefficient of the impulse response. In this case, the pulse interval can be acquired so as to reduce the difference between the synthesized signal and the input signal, thus improving the quality.

Although the subframe length is constant, it may be set variable subframe by subframe; setting it variable can ensure fine control of the number of excitation pulses in the subframe in accordance with the statistical characteristic of the speech signal, presenting an effect of enhancing the coding efficiency.

Further, although the $\alpha$ parameter is used as the prediction parameter, well-known parameters having an excellent quantizing property, such as the K parameter or LSP parameter and a log area ratio parameter, may be used instead.

Furthermore, although the covariance coefficient in the equation (31) of calculating the excitation pulse amplitude is calculated according to the equations (32) and (33), the design may be modified so that the autocorrelation coefficient is calculated by the following equation.

$$\phi_{hh}(i, j) = \overline{\phi}_{hh}(i, j) = \sum_{n=1}^{N-(i,j)} hw(n)hw(n-(i-j)\} \quad (36)$$

This design can significantly reduce the amount of calculation required to calculate $\psi_{hh}$, thus reducing the amount of calculation in the whole coding.

Figure 9:
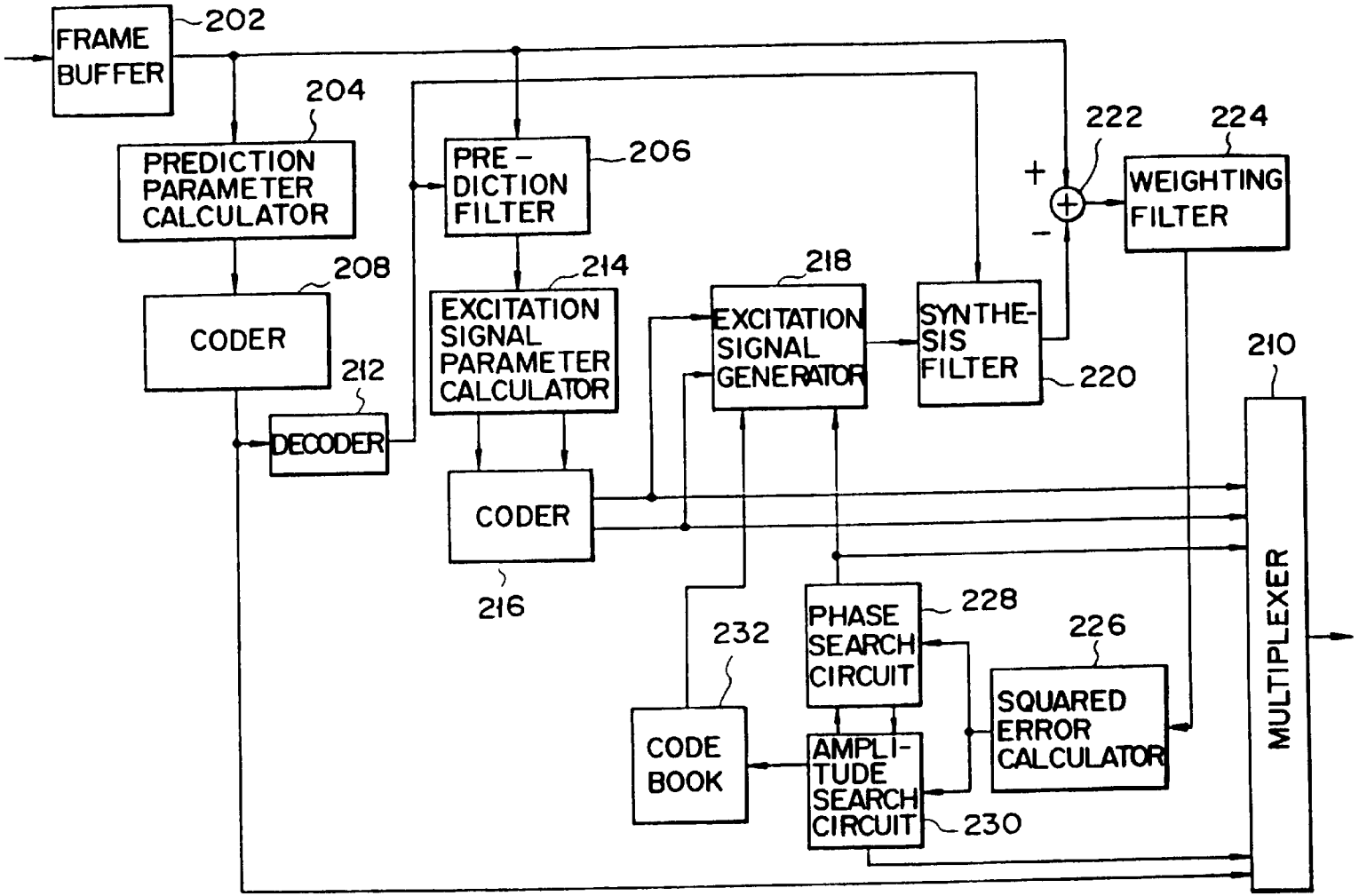
FIG. 9 is a block diagram of a coding apparatus according to the third embodiment of the present invention.
Figure 11:
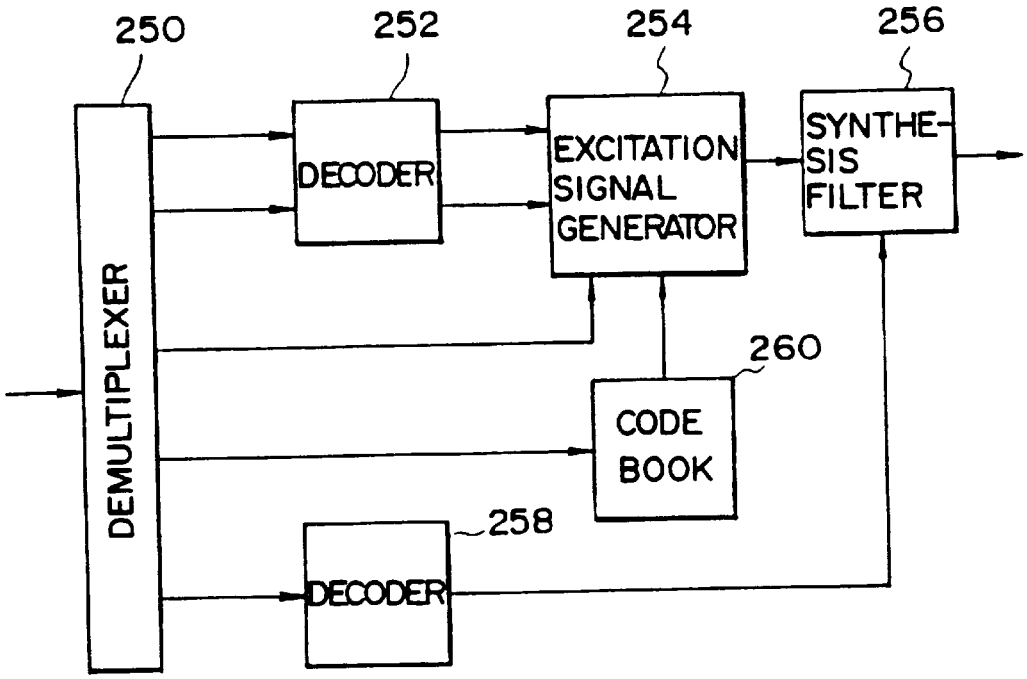
FIG. 11 is a block diagram of a decoding apparatus according to the third embodiment of the present invention.

FIG. 9 is a block diagram showing a coding apparatus according to the third embodiment, and FIG. 11 is a block diagram of a decoding apparatus according to the third embodiment. In FIG. 9, a speech signal after A/D conversion is input to a frame buffer 202, which accumulates the speech signal for one frame. Therefore, individual elements in FIG. 9 perform the following processes frame by frame.

Figure 10:
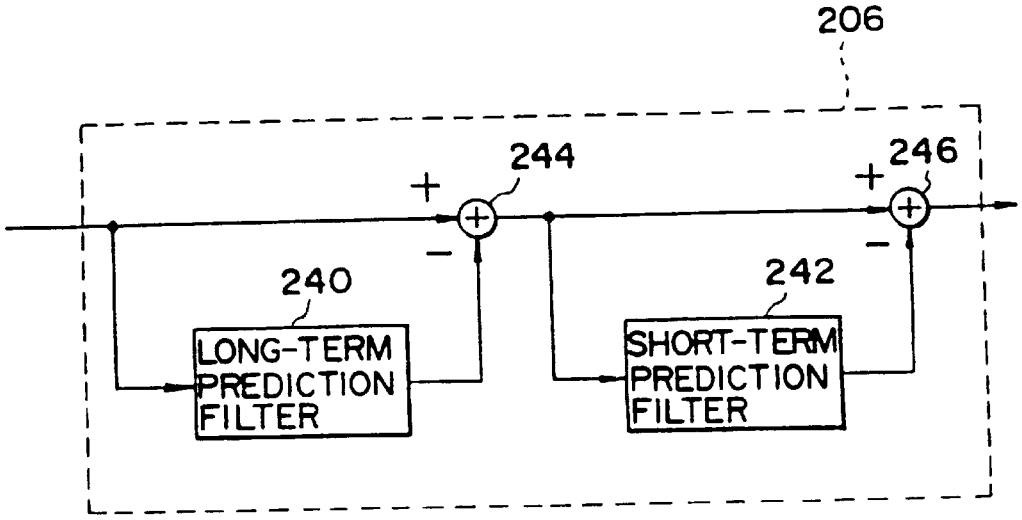
FIG. 10 is a block diagram of a prediction filter in the third embodiment.

A prediction parameter calculator 204 calculates prediction parameters using a known method. When a prediction filter 206 is constituted to have a long-term prediction filter (pitch prediction filter) 240 and a short-term prediction filter 242 cascade-connected as shown in FIG. 10, he prediction parameter calculator 204 calculates a pitch period, a pitch prediction coefficient, and a linear prediction coefficient (LPC parameter or reflection coefficient) by a know method, such as an autocorrelation method or covariance method. The calculation method is described in the document 2.

The calculated prediction parameters are sent to a prediction parameter coder 208, which codes the prediction parameters based on a predetermined number of quantization bits, and outputs the codes to a multiplexer 210 and a decoder 212. The decoder 212 sends decoded values to a prediction filter 206 and a synthesis filter 220. The prediction filter 206 receives the speech signal and a prediction parameter, calculates a prediction residual signal, then sends it to a parameter calculator 214.

The excitation signal parameter calculator 214 first divides the prediction residual signal for one frame into a plurality of subframes, and calculates the square sum of the prediction residual signals of the subframes. Then, based on the square sum of the prediction residual signals, the density of the excitation pulse train signal or the pulse interval in each subframe is acquired. One example of practical methods for the process is such that, as pulse intervals, two types (long and short ones) or the number of subframes of long pulse intervals and the number of subframes of short pulse intervals are set in advance, a small value is selected for the pulse interval in the order of subframes having a larger square sum. The excitation signal parameter calculator 214 acquires two types of gain of the excitation signal using the standard deviation of the prediction residual signals of all the subframes having a short pulse interval and that of the prediction residual signals of all the subframes having a long pulse interval.

The acquired excitation signal parameters, i.e., the excitation pulse interval and the gain, are coded by an excitation signal parameter coder 216, then sent to the multiplexer 210, and these decoded values are sent to an excitation signal generator 218. The generator 218 generates an excitation signal having different densities subframe by subframe based on the excitation pulse interval and gain supplied from the coder 216, the normalized amplitude of the excitation pulse supplied from a code book 232, and the phase of the excitation pulse supplied from a phase search circuit 228.

Figure 12:
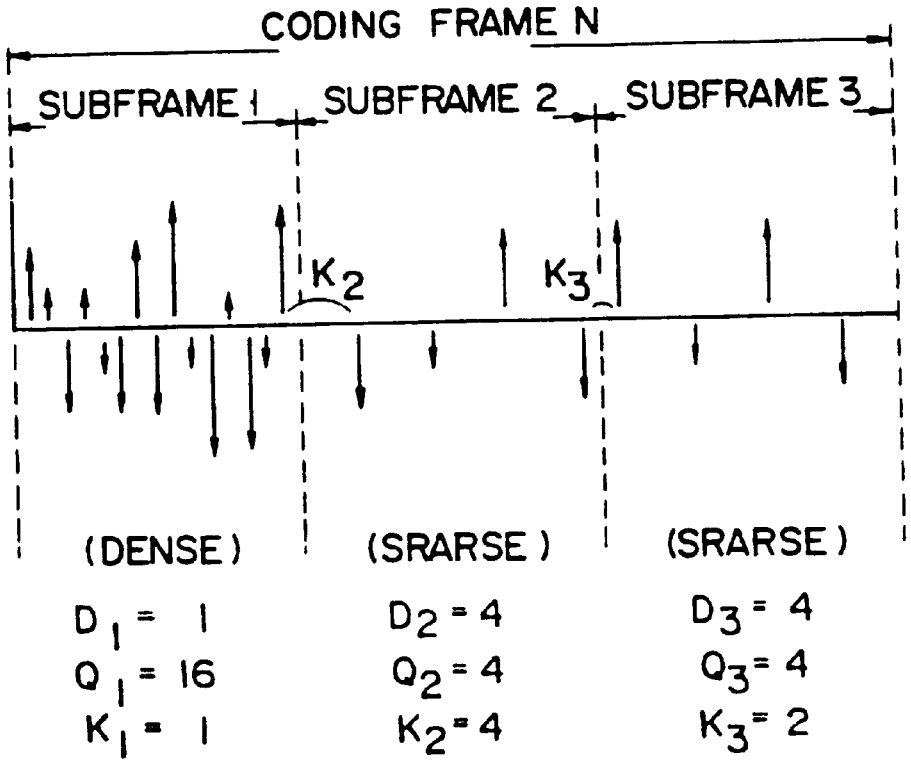
FIG. 12 is a diagram exemplifying an excitation signal which is generated in the third embodiment.

FIG. 12 illustrates one example of an excitation signal produced by the excitation signal generator 218. With G(m) being the gain of the excitation pulse in the m-th subframe, $g_i^{(m)}$ being the normalized amplitude of the excitation pulse, $Q_m$ being the pulse number, $D_m$ being the pulse interval, $K_m$ being the phase of the pulse, and L being the length of the subframe, the excitation signal $V^{(m)}(n)$ is expressed by the following equation.

$$v^{(m)}(n) = G \cdot \sum_{i=1}^{Q_m} g_i^{(m)} \cdot \delta\{(n-(i-1)D_m - K_m\} \quad (37)$$

$(n=1, 2, \ldots L;\ 1 \leqq K_m \leqq D_m)$ where the phase $K_m$ is the leading position of the pulse in the subframe, and $\delta(n)$ is a Kronecker delta function.

The excitation signal produced by the excitation signal generator 218 is input to the synthesis filter 220 from which a synthesized signal is output. The synthesis filter 220 has an inverse filter relation to the prediction filter 206. The difference between the input speech signal and the synthesized signal, which is the output of a subtracter 222, has its spectrum altered by a perceptional weighting filter 224, then sent to a squared error calculator 226. The perceptional weighting filter 226 is provided to utilize the masking effect of perception.

The squared error calculator 226 calculates the square sum of the error signal undergone perceptional weighting for each code word accumulated in the code book 232 and for each phase of the excitation pulse output from the phase search circuit 228, then sends the result of the calculation to the phase search circuit 228 and an amplitude search circuit 230. The amplitude search circuit 230 searches the code book 232 for a code word which minimizes the square sum of the error signal for each phase of the excitation pulse from the phase search circuit 228, and sends the minimum value of the square sum to the phase search circuit 228 while holding the index of the code word minimizing the square sum. The phase search circuit 228 changes the phase $K_m$ of the excitation pulse within a range of $1 \leqq K_m \leqq D_m$ in accordance with the interval $D_m$ of the excitation pulse train, and sends the value to the excitation signal generator 218. The phase search circuit 228 receives the minimum values of the square sums of the error signal respectively determined to individual $D_m$ phases from the amplitude search circuit, and sends the phase corresponding to the smallest square sum among the $D_m$ minimum values to the multiplexer 210, and at the same time, informs the amplitude search circuit 230 of the phase at that time. The amplitude search circuit 230 sends the index of the code word corresponding to this phase to the multiplexer 210.

The code book 232 is prepared by storing the amplitude of the normalized excitation pulse train, and through the LBG algorithm using white noise or the excitation pulse train analytically acquired to speech data as a training vector. As a method of obtaining the excitation pulse train, it is possible to employ the method of analytically acquiring the excitation pulse train so as to minimize the square sum of the error signal undergone perceptional weighting as explained with reference to the second embodiment. Since the details have already given with reference to the equations (17) to (34), the description will be omitted. The amplitude $g_i^{(m)}$ of the excitation pulse with the phase $K_m$ is acquired by solving the equation (34). The pulse amplitude is attained for each value of the phase $K_m$, the weighted squared error at that time is calculated, and the amplitude is selected to minimize it.

The multiplexer 210 multiplexes the prediction parameter, the excitation signal parameter, the phase of the excitation pulse, and the code of the amplitude, and sends the result on a transmission path or the like (not shown). The output of the subtracter 222 may be directly input to the squared error calculator 226 without going through the weighting filter 224.

The above is the description of the coding apparatus. Now the decoding apparatus will be discussed. Referring to FIG. 11, a demultiplexer 250 separates a code coming through a transmission path or the like into the prediction parameter, the excitation signal parameter, the phase of the excitation pulse, and the code of the amplitude of the excitation pulse. An excitation signal parameter decoder 252 decodes the codes of the interval of the excitation pulse and the gain of the excitation pulse, and sends the results to an excitation signal generator 254.

A code book 260, which is the same as the code book 232 of the coding apparatus, sends a code word corresponding to the index of the received pulse amplitude to the excitation signal generator 254. A prediction parameter decoder 258 decodes the code of the prediction parameter encoded by a prediction parameter coder 408, then sends the decoded value to a synthesis filter 256. The excitation signal generator 254, like the generator 218 in the coding apparatus, generates excitation signals having different densities subframe by subframe based on the gains of the received excitation pulse interval and the excitation pulse, the normalized amplitude of the excitation pulse, and the phase of the excitation pulse. The synthesis filter 256, which is the same as the synthesis filter 220 in the coding apparatus, receives the excitation signal and prediction parameter and outputs a synthesized signal.

Figure 13:
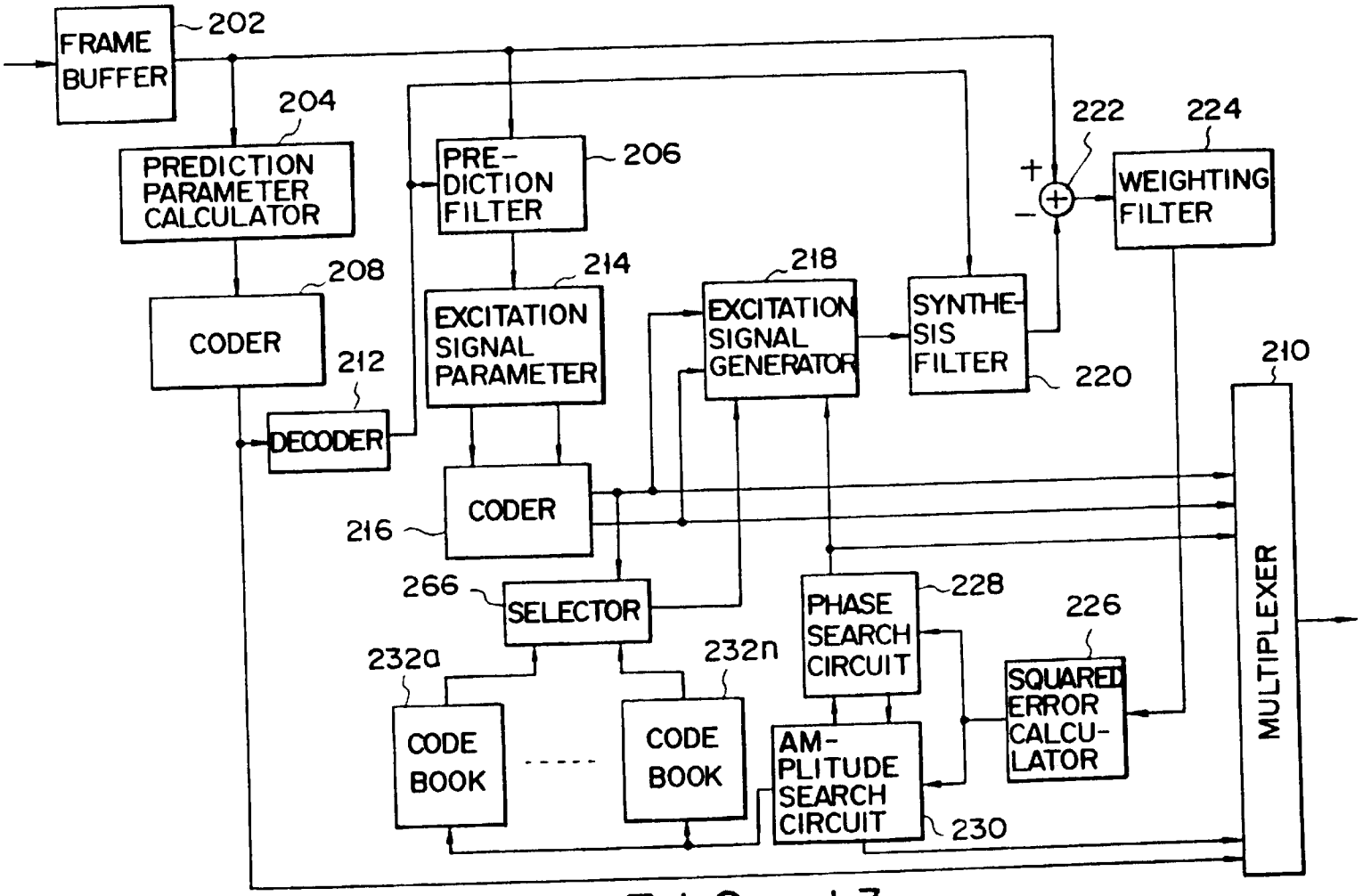
FIG. 13 is a block diagram of a coding apparatus according to the fourth embodiment of the present invention.
Figure 14:
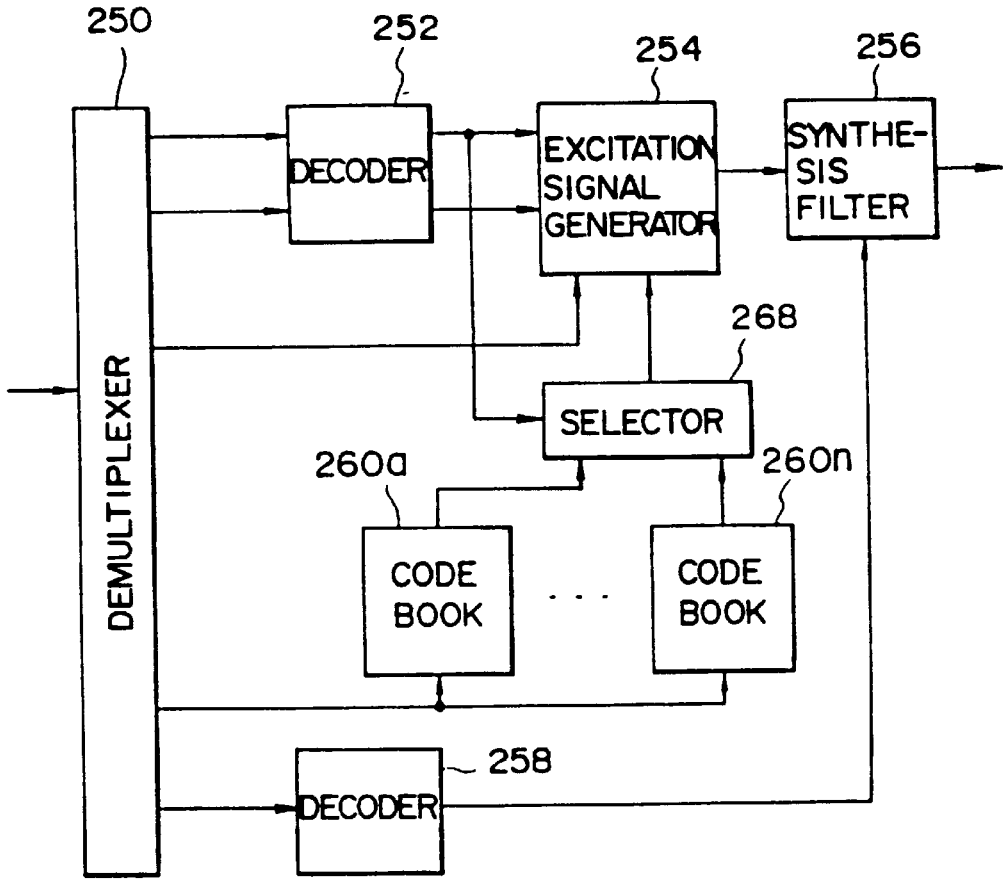
FIG. 14 is a block diagram of a decoding apparatus according to the fourth embodiment.

Although there is one type of a code book in the third embodiment, a plurality of code books may be prepared and selectively used according to the interval of the excitation pulse. Since the statistical property of the excitation pulse train differs in accordance with the interval of the excitation pulse, the selective use can improve the performance. FIGS. 13 and 14 present block diagrams of a coding apparatus and a decoding apparatus according to the fourth embodiment employing this structure. Referring to FIGS. 13 and 14, those circuits given the same numerals as those in FIGS. 9 and 11 have the same functions. A selector 266 in FIG. 13 and a selector 268 in FIG. 14 are code book selectors to select the output of the code book in accordance with the phase of the excitation pulse.

According to the third and fourth embodiments, the pulse interval of the excitation signal can also be changed subframe by subframe in such a manner that the interval is denser for those subframes containing important information or many pieces of information and is sparser for the other subframes, thus presenting an effect of improving the quality of the synthesized signal.

The third and fourth embodiment may be modified as per the first and second embodiments.

Figure 15:
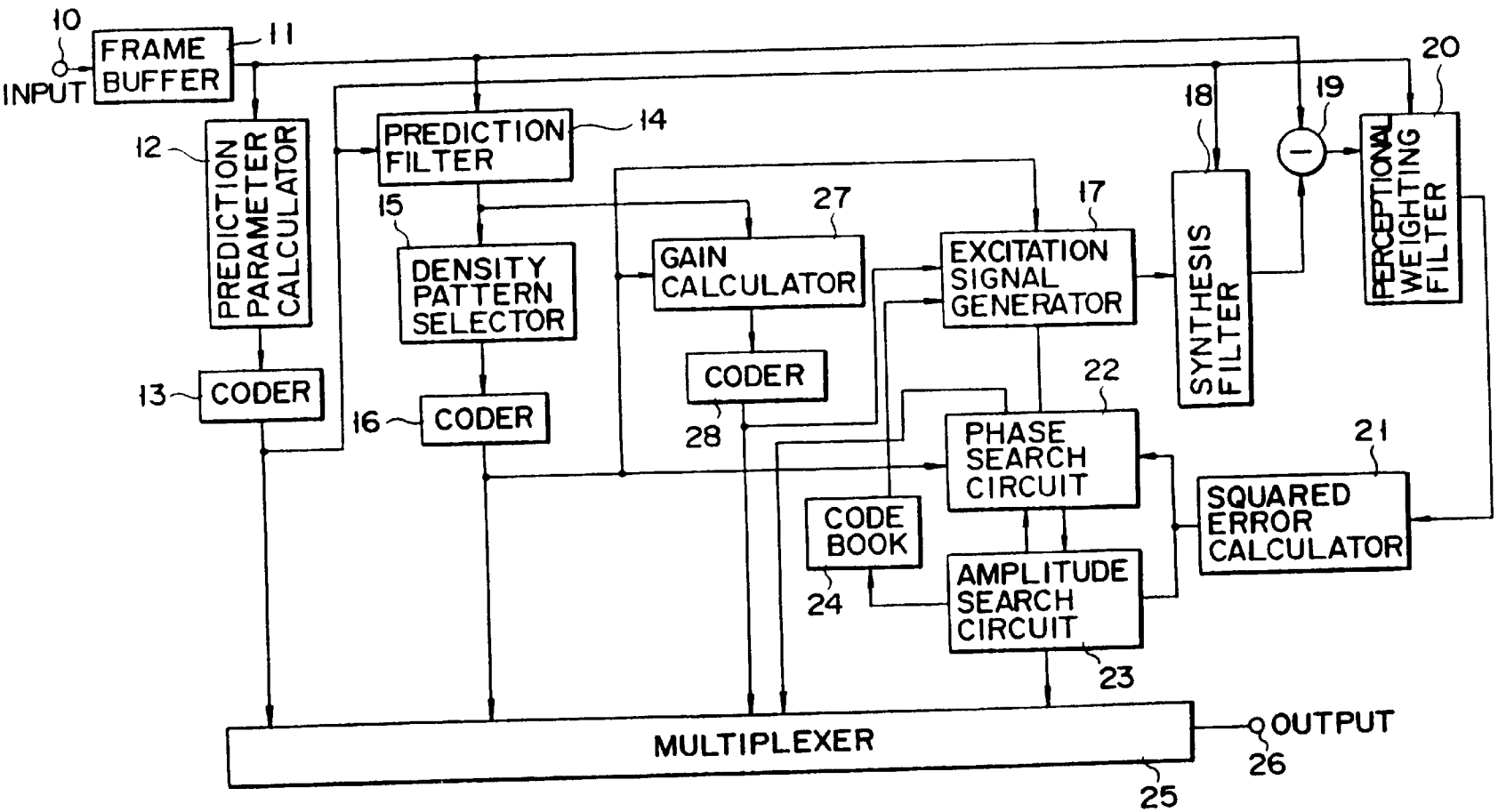
FIG. 15 is a block diagram of a coding apparatus according to the fifth embodiment of the present invention.
Figure 16:
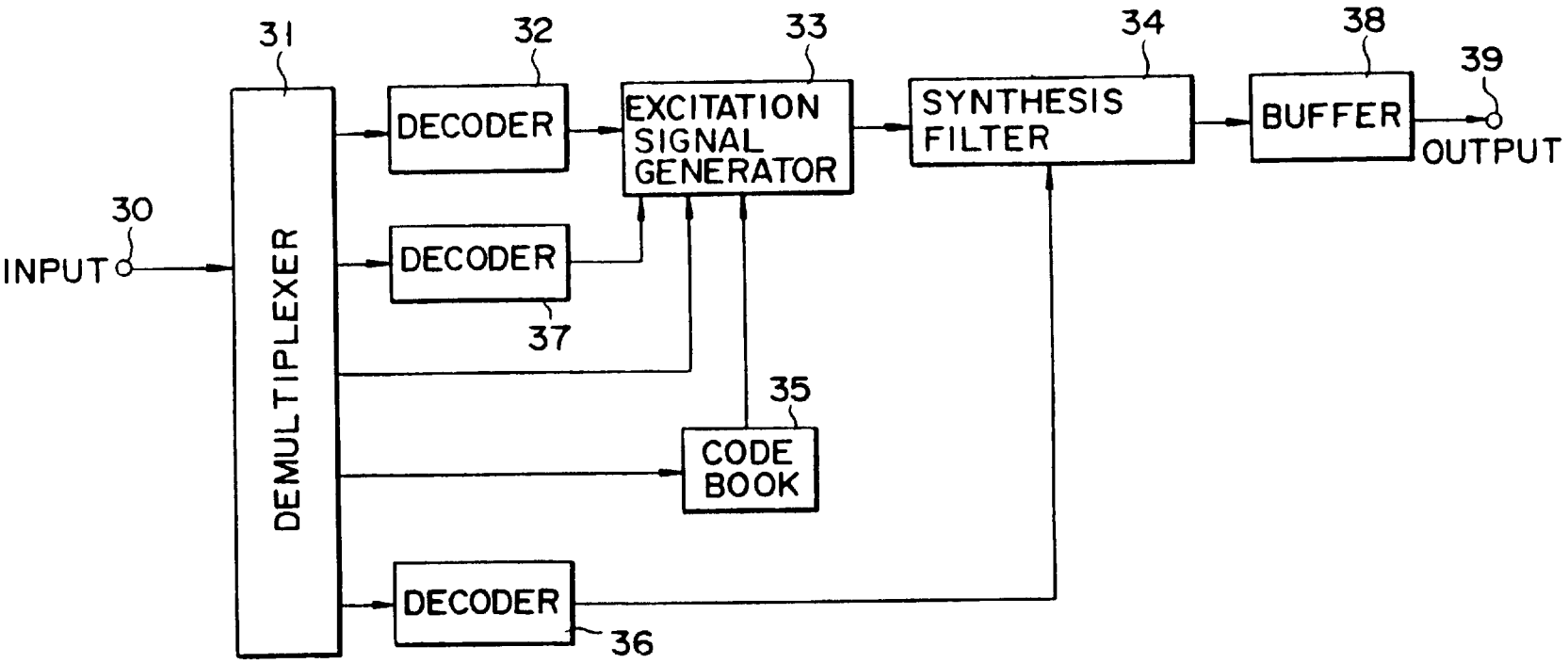
FIG. 16 is a block diagram of a decoding apparatus according to the fifth embodiment.

FIGS. 15 and 16 are block diagrams showing a coding apparatus and a decoding apparatus according to the fifth embodiment. A frame buffer 11 accumulates one frame of speech signal input to an input terminal 10. Individual elements in FIG. 15 perform the following processes for each frame or each subframe using the frame buffer 11.

Figure 17:
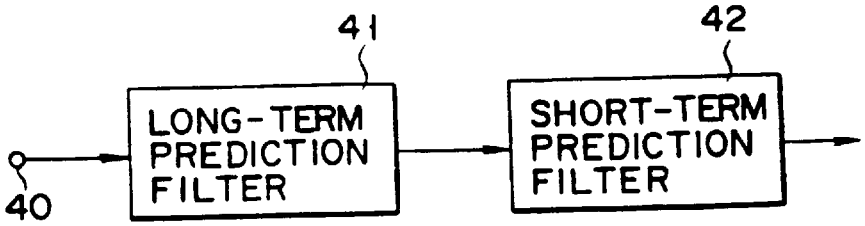
FIG. 17 is a block diagram of a prediction filter in the fifth embodiment.

A prediction parameter calculator 12 calculates prediction parameters using a known method. When a prediction filter 14 is constituted to have a long-term prediction filter 41 and a short-term prediction filter 42 which are cascade-connected as shown in FIG. 17, the prediction parameter calculator 12 calculates a pitch period, a pitch prediction coefficient, and a linear prediction coefficient (LPC parameter or reflection coefficient) by a known method, such as an autocorrelation method or covariance method. The calculation method is described in, for example, the document 2.

The calculated prediction parameters are sent to a prediction parameter coder 13, which codes the prediction parameters based on a predetermined number of quantization bits, and outputs the codes to a multiplexer 25, and sends a decoded value to a prediction filter 14, a synthesis filter 15, and a perceptional weighting filter 20. The prediction filter 14 receives the speech signal and a prediction parameter, calculates a prediction residual signal, then sends it to a density pattern selector 15.

As the density pattern selector 15, the one used in a later-described embodiment may be employed; in this embodiment, the selector 15 first divides the prediction residual signal for one frame into a plurality of subframes, and calculates the square sum of the prediction residual signals of the subframes. Then, based on the square sum of the prediction residual signals, the density (pulse interval) of the excitation pulse train signal in each subframe is acquired. One example of practical methods for the process is such that, as the density patterns, two types of pulse intervals (long and short ones) or the number of subframes of long pulse intervals and the number of subframes of short pulse intervals are set in advance, the density pattern to reduce the pulse interval is selected in the order of subframes having a larger square sum.

A gain calculator 27 receives information of the selected density pattern and acquires two types of gain of the excitation signal using the standard deviation of the prediction residual signals of all the subframes having a short pulse interval and that of the prediction residual signals of all the subframes having a long pulse interval. The acquired density pattern and gain are respectively coded by coders 16 and 28, then sent to the multiplexer 25, and these decoded values are sent to an excitation signal generator 17. The generator 17 generates an excitation signal having different densities for each subframe based on the density pattern and gain coming from the coders 16 and 28, the normalized amplitude of the excitation pulse supplied from a code book 24, and the phase of the excitation pulse supplied from a phase search circuit 22.

Figure 18:
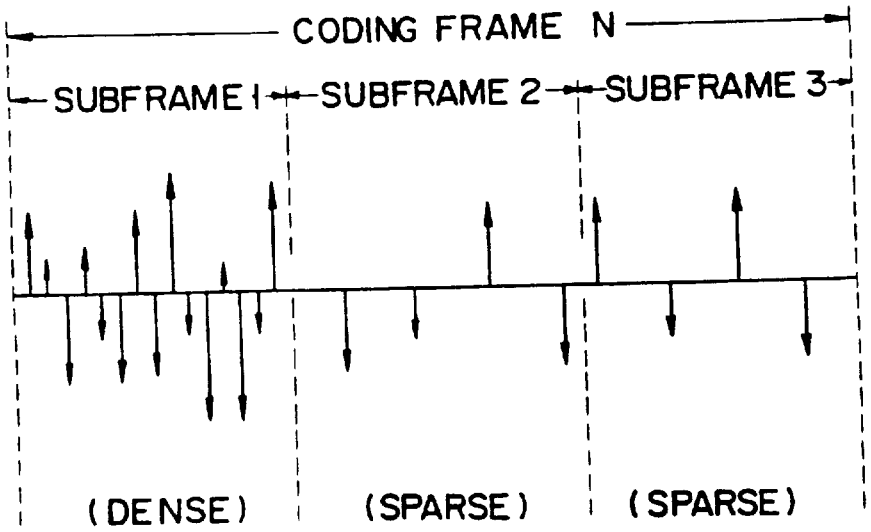
FIG. 18 is a diagram exemplifying an excitation signal which is generated in the fifth embodiment.

FIG. 18 illustrates one example of an excitation signal produced by the excitation signal generator 17. With G(m) being the gain of the excitation pulse in the m-th subframe, $g_i^{(m)}$ being the normalized amplitude of the excitation pulse, $Q_m$ being the pulse number, $D_m$ being the pulse interval, $K_m$ being the phase of the pulse, and L being the length of the subframe, the excitation signal $ex^{(m)}(n)$ is expressed by the following equation.

$$ex^{(m)}(n) = G^{(m)} \cdot \sum_{i=1}^{Q_m} g_i^{(m)} \cdot \delta\{(n - (i - 1)D_m - K_m\} \quad (38)$$

$(n=1, 2, \ldots L;\ 1 \leqq K_m \leqq D_m)$ where the phase $K_m$ is the leading position of the pulse in the subframe, and o(n) is a Kronecker delta function.

The excitation signal produced by the excitation signal generator 17 is input to the synthesis filter 18 from which a synthesized signal is output. The synthesis filter 18 has an inverse filter relation to the prediction filter 14. The difference between the input speech signal and the synthesized signal, which is the output of a subtracter 19, has its spectrum altered by a perceptional weighting filter 20, then sent to a squared error calculator 21. The perceptional weighting filter 20 is a filter whose transfer function is expressed by $$W(z)=A(z)/A(z/\beta) \quad (39)$$

$(0 \leqq \gamma \leqq 1)$ and, like the weighting filter, it is for utilizing the masking effect of audibility. Since it is described in detail in the document 2, its description will be omitted.

The squared error calculator 21 calculates the square sum of the error signal undergone perceptional weighting for each code vector accumulated in the code book 24 and for each phase of the excitation pulse output from the phase search circuit 22, then sends the result of the calculation to the phase search circuit 22 and an amplitude search circuit 23. The amplitude search circuit 23 searches the code book 24 for the index of a code word which minimizes the square sum of the error signal for each phase of the excitation pulse from the phase search circuit 22, and sends the minimum value of the square sum to the phase search circuit 22 while holding the index of the code word minimizing the square sum. The phase search circuit 22 receives the information of the selected density pattern, changes the phase Km of the excitation pulse train within a range of $1 \leqq K_m \leqq Dm$, and sends the value to the excitation signal generator 17. The circuit 22 receives the minimum values of the square sums of the error signal respectively determined to individual Dm phases from the amplitude search circuit 23, and sends the phase corresponding to the smallest square sum among the Dm minimum values to the multiplexer 25, and at the same time, informs the amplitude search circuit 230 of the phase at that time. The amplitude search circuit 23 sends the index of the code word corresponding to this phase to the multiplexer 25.

The multiplexer 25 multiplexes the prediction parameter, the density pattern, the gain, the phase of the excitation pulse, and the code of the amplitude, and sends the result on a transmission path through an output terminal 26. The output of the subtracter 19 may be directly input to the squared error calculator 21 without going through the weighting filter 20.

Figure 1:
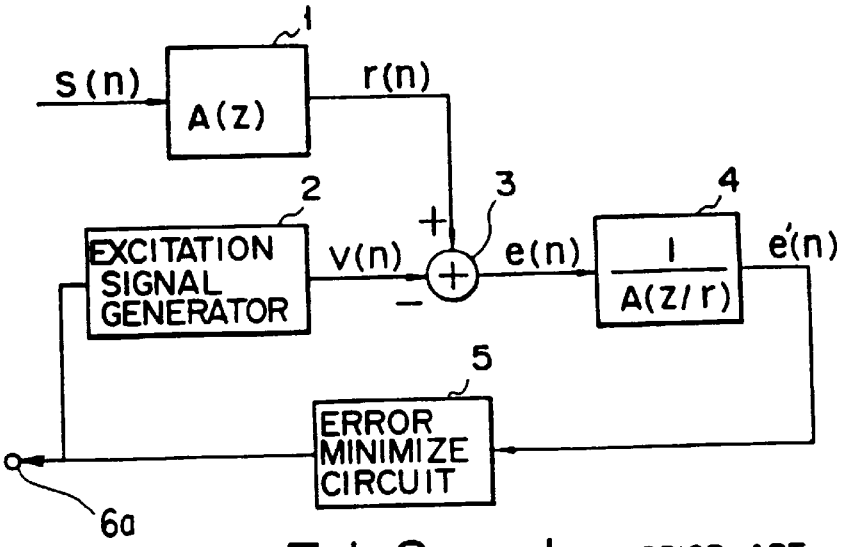
FIG. 1 PRIOR ART
FIGS. 1 and 2 are block diagrams illustrating the structures of a conventional coding apparatus and decoding apparatus.
Figure 2:
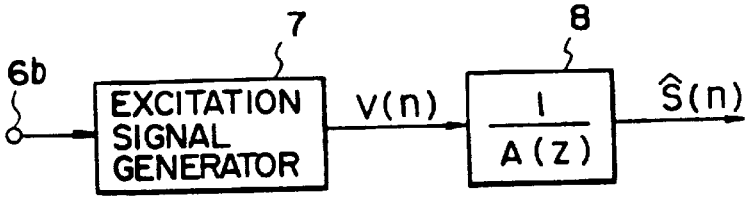
FIG. 2 PRIOR ART
Figure 3A:
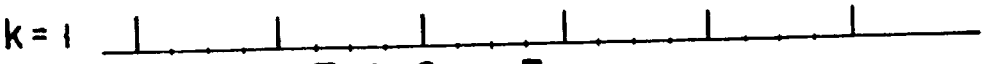
FIG. 3a PRIOR ART
FIGS. 3A–3D are diagram exemplifying an excitation signal according to the prior art.
Figure 3B:
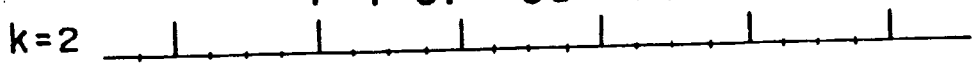
FIG. 3b PRIOR ART
Figure 3C:
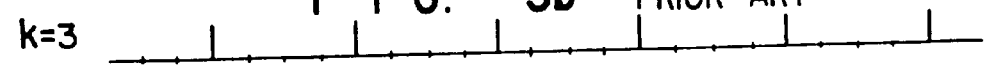
FIG. 3c PRIOR ART
Figure 3D:
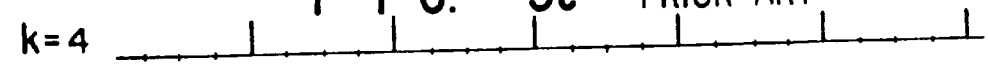
FIG. 3d PRIOR ART

Now the decoding apparatus shown in FIG. 16 will be discussed. Referring to FIG. 16, a demultiplexer 31 separates a code coming through an input terminal 30 into the prediction parameter, the density pattern, the gain, the phase of the excitation pulse, and the code of the amplitude of the excitation pulse. Decoders 32 and 37 respectively decode the code of the density pattern of the excitation pulse and the code of the gain of the excitation pulse, and sends the results to an excitation signal generator 33. A code book 35, which is the same as the code book 24 in the coding apparatus shown in FIG. 1, sends a code word corresponding to the index of the received pulse amplitude to the excitation signal generator 33.

A prediction parameter decoder 36 decodes the code of the prediction parameter encoded by the prediction parameter coder 13 in FIG. 15, then sends the decoded value to a synthesis filter 34. The excitation signal generator 33, like the generator 17 in the coding apparatus, generates excitation signals having different densities subframe by subframe based on the normalized amplitude of the excitation pulse and the phase of the excitation pulse. The synthesis filter 34, which is the same as the synthesis filter 18 in the coding apparatus, receives the excitation signal and prediction parameter and sends a synthesized signal to a buffer 38. The buffer 38 links the input signals frame by frame, then sends the synthesized signal to an output terminal 39.

Figure 19:
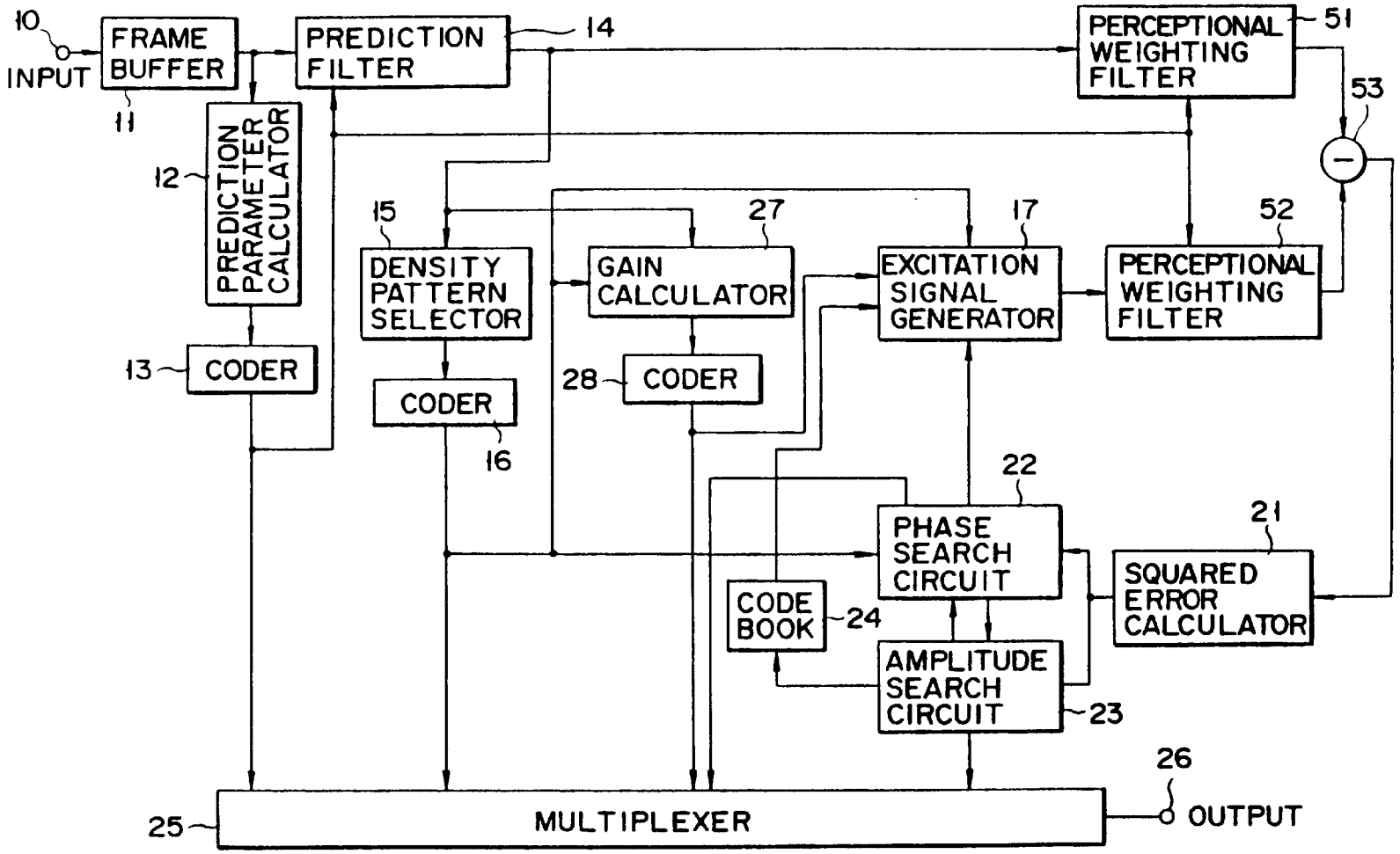
FIG. 19 is a block diagram of a coding apparatus according to the sixth embodiment of the present invention.

FIG. 19 is a block diagram of a coding apparatus according to the sixth embodiment of the present invention. This embodiment is designed to reduce the amount of calculation required for coding the pulse train of the excitation signal to approximately ½ while having the same performance as the coding apparatus of the fifth embodiment.

The following briefly discusses the principle of the reduction of the amount of calculation. The perceptional-weighted error signal ew(n) input to the squared error calculator 21 in FIG. 15 is given by follows.

$$ew(n)=\{s(n)-e_{xc}(n) * h(n)\} * W(n) \quad (40)$$

where s(n) is the input speech signal, $e_{xc}(n)$ is a candidate of the excitation signal, h(n) is the impulse response of the synthesis filter 18, W(n) is the impulse response of the audibility weighting filter 20, and * represents the convolution of the time.

Performing z transform on both sides of the equation (40) yields the following equation.

$$Ew(z)=\{S(z)-E_{xc}(z)\cdot H(z)\}W(z) \quad (41)$$

Since H(z) and W(z) in the equation (41) can be defined as following using the transfer function A(z) of the prediction filter 14, $$H(z)=1/A(z) \quad (42)$$

$$W(z)=A(z)/A(z/\gamma) \quad (43)$$

$(0 \leqq \gamma \leqq 1)$ substituting the equations (42) and (43) into the equation (41) yields the following equation.

$$W(z)=\{S(z)\ A(z)\}\cdot\{1/A(z/\gamma)\}-E_{xc}(z)\{1/A(z/\gamma)\} \quad (44)$$

Performing inverse z transform on the equation yields the following equation.

$$ew(n)=x(n)\cdot e_{xc}(n) * hw(n) \quad (45)$$

where x(n) is the perceptional-weighted input signal, $e_{xc}(n)$ is a candidate of the excitation signal, and hw(n) is the impulse response of the perceptional weighting filter having the transfer function of $1/A(z/\gamma)$.

Comparing the equation (40) with the equation (45), the former equation requires a convolution calculation by two filters for a single excitation signal candidate $e_{xc}(n)$ in order to calculate the perceptional-weighted error signal ew(n) whereas the latter needs a convolution calculation by a single filter. In the actual coding, the perceptional-weighted error signal is calculated for several hundred to several thousand candidates of the excitation signal, so that the amount of calculation concerning this part occupies the most of the amount of the entire calculation of the coding apparatus. If the structure of the coding apparatus is changed to use the equation (45) instead of the equation (40), therefore, the amount of calculation required for the coding process can be reduced in the order of ½, further facilitating the practical use of the coding apparatus.

In the coding apparatus of the sixth embodiment shown in FIG. 19, since those blocks having the same numerals as given in the fifth embodiment shown in FIG. 15 have the same functions, their description will be omitted here. A first perceptional weighting filter 51 having a transfer function of $1/A(z/\gamma)$ receives a prediction residual signal r(n) from the prediction filter 14 with a prediction parameter as an input, and outputs a perceptional-weighted input signal x(n). A second perceptional weighting filter 52 having the same characteristic as the first perceptional weighting filter 51 receives the candidate $e_{xc}(n)$ of the excitation signal from the excitation signal generator 17 with the prediction parameter as an input, and outputs a perceptional-weighted synthesized signal candidate xc(n). A subtracter 53 sends the difference between the perceptional-weighted input signal x(n) and the perceptional-weighted synthesized signal candidate xc(n) or the perceptional-weighted error signal ew(n) to the squared error calculator 21.

Figure 20:
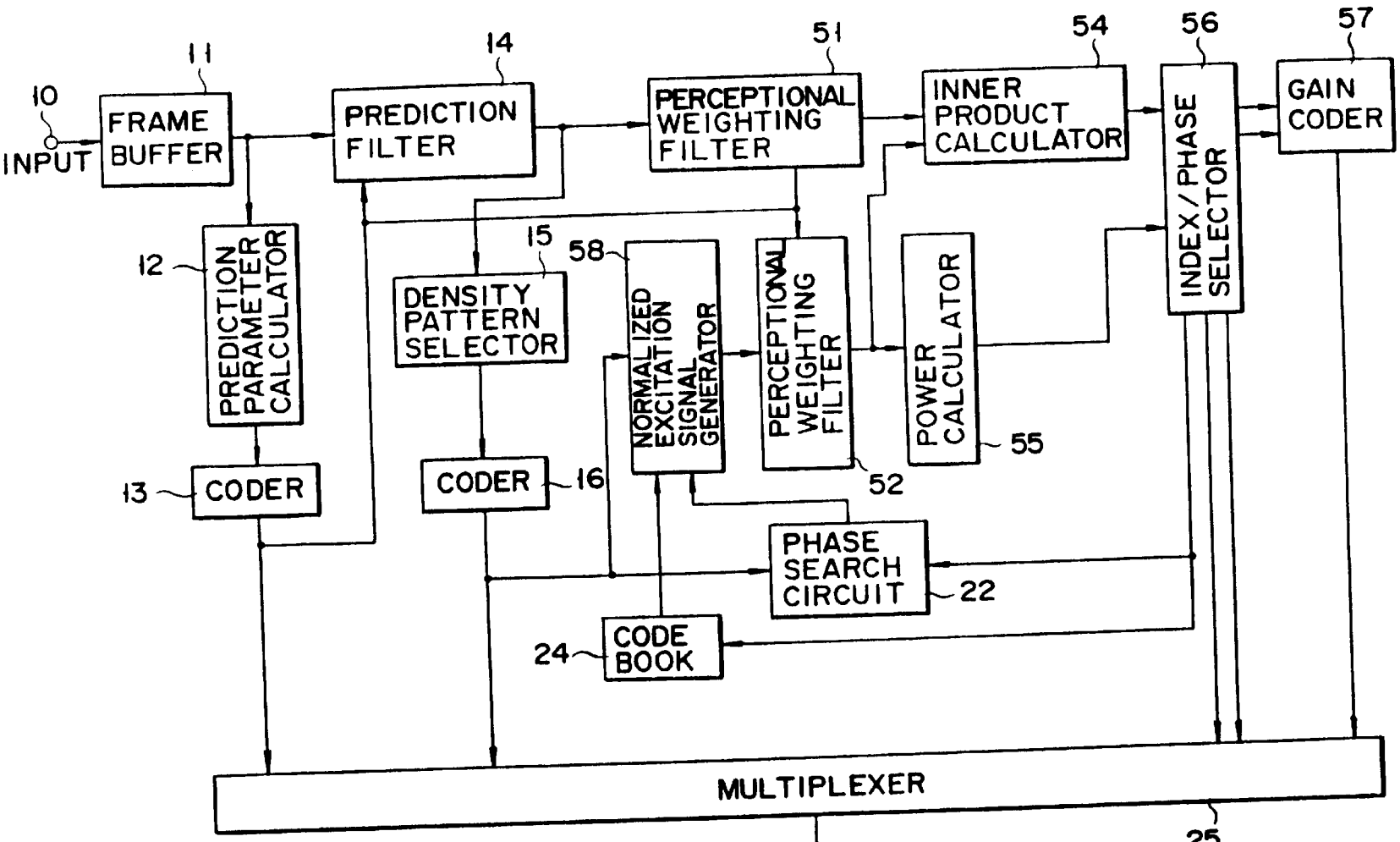
FIG. 20 is a block diagram of a coding apparatus according to the seventh embodiment of the present invention.

FIG. 20 is a block diagram of a coding apparatus according to the seventh embodiment of the present invention. This coding apparatus is designed to optimally determine the gain of the excitation pulse in a closed loop while having the same performance as the coding apparatus shown in FIG. 19, and further improves the quality of the synthesized sound.

In the coding apparatuses shown in FIGS. 15 and 19, with regard to the gain of the excitation pulse, every code vector output from the code book normalized using the standard deviation of the prediction residual signal of the input signal is multiplied by a common gain G to search for the phase J and the index I of the code book. According to this method, the optimal phase J and index I are selected with respect to the settled gain G. However, the gain, phase, and index are not simultaneously optimized. If the gain, phase, and index can be simultaneously optimized, the excitation pulse can be expressed with higher accuracy, thus remarkably improving the quality of the synthesized sound.

The following will explain the principle of the method of simultaneously optimizing the gain, phase, and index with high efficient.

The aforementioned equation (45) may be rewritten into the following equation (46).

$$ew(n)=x(n)-G_{ij}\times xj^{(n)}(i)(n) \tag{46}$$

where ew(n) is the perceptional-weighted error signal, x(n) is the perceptional-weighted input signal, Gij is the optimal gain for the excitation pulse having the index i and the phase j, and $xj^{(i)}(n)$ is a candidate of the perceptional-weighted synthesized signal acquired by weighting that excitation pulse with the index i and phase j which is not multiplied by the gain, by means of the perceptional weighting filter having the aforementioned transfer function of $1/A(z/\gamma)$. By letting Ew/Gij, a value obtained by partially differentiating the power of the perceptional-weightinged error signal $$Ew = \sum_n \{ew(n)\}^2 \tag{47}$$

by the optimal gain, to zero, the optimal gain Gij is determined as follows.

$$G_{ij} = \left[\sum_n x(n)\cdot x_j^{(i)}(n)\right] / \left[\sum_n \{x_j^{(i)}(n)\}^2\right] \tag{48}$$

Let $$A_j^{(i)} = \sum_n x(n)\cdot x_j^{(i)}(n) \tag{49}$$

$$B_j^{(i)} = \sum_n \{x_j^{(i)}(n)\}^2 \tag{50}$$

then, the equation (48) can be expressed as follows.

$$G_{ij}=A_j^{(i)}/B_j^{(i)} \tag{51}$$

Substituting the equation (51) into the equation (47), the minimum value of the power of the perceptional-weighted error signal can be given by the following equation.

$$(Ew)_{min}=\Sigma\{x(n)\}^2-\{A_j^{(i)}\}^2/B_j^{(i)} \tag{52}$$

The index i and phase j which minimize the power of the perceptional-weighted error signal in the equation (52) are equal to those which maximize $\{Aj^{(i)}\}^2/Bj^{(i)}$. As one example to simultaneously acquire the optimal index I, phase J, and gain $G_{IJ}$, therefore, first, $Aj^{(i)}$ and $Bj^{(i)}$ are respectively obtained for candidates of the index i and phase j by the equations (49) and (50), then a pair of the index I and phase J which maximize $\{Aj^{(i)})^2/Bj^{(i)}$ is searched and $G_{IJ}$ has only to be obtained using the equation (51) before the coding.

The coding apparatus shown in FIG. 20 differs from the coding apparatus in FIG. 19 only in its employing the method of simultaneously optimizing the index, phase, and gain. Therefore, those blocks having the same functions as those shown in FIG. 19 are given the same numerals used in FIG. 19, thus omitting their description. Referring to FIG. 20, the phase search circuit 22 receives density pattern information and phase updating information from an index/phase selector 56, and sends phase information j to a normalization excitation signal generator 58. The generator 58 receives a prenormalized code vector C(i) (i: index of the code vector) to be stored in a code book 24, density pattern information, and phase information j, interpolates a predetermined number of zeros at the end of each element of the code vector based on the density pattern information to generate a normalized excitation signal having a constant pulse interval in a subframe, and sends as the final output, the normalized excitation signal shifted in the forward direction of the time axis based on the input phase information j, to a perceptional weighting filter 52.

An inner product calculator 54 calculates the inner product, $Aj^{(i)}$, of a perceptional-weighted input signal x(n) and a perceptional-weighted synthesized signal candidate $xj^{(i)}(n)$ by the equation (49), and sends it to the index/phase selector 56. A power calculator 55 calculates the power, $Bj^{(i)}$, of the perceptional-weighted synthesized signal candidate $xj^{(i)}(n)$ by the equation (50), then sends it to the index/phase selector 56. The index/phase selector 56 sequentially sends the updating information of the index and phase to the code book 24 and the phase search circuit 22 in order to search for the index I and phase J which maximize $\{Aj^{(i)}\}^2/Bj^{(i)}$, the ratio of the square of the received inner product value to the power. The information of the optimal index I and phase J obtained by this searching is output to the multiplexer 25, and $A_J^{(I)}$ and $B_J^{(I)}$ are temporarily saved. A gain coder 57 receives $A_J^{(I)}$ and $B_J^{(I)}$ from the index/phase selector 56, executes the quantization and coding of the optimal gain $A_J^{(I)}/B_J^{(I)}$, then sends the gain information to the multiplexer 25.

Figure 21:
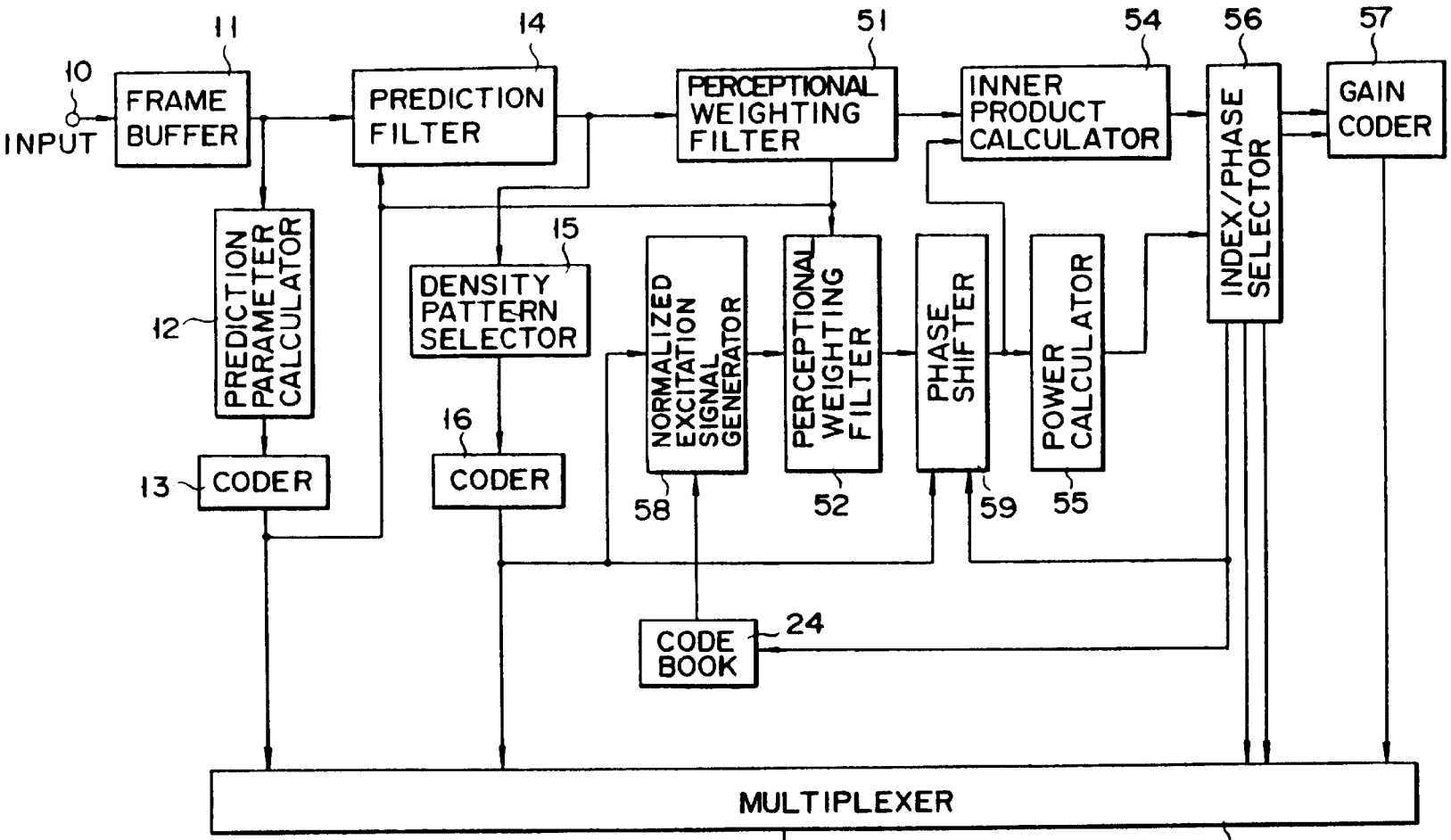
FIG. 21 is a block diagram of a coding apparatus according to the eighth embodiment of the present invention.

FIG. 21 is a block diagram of a coding apparatus according to the eighth embodiment of the present invention. This coding apparatus is designed to be able to reduce the amount of calculation required to search for the phase of an excitation signal while having the same function as the coding apparatus in FIG. 20.

Referring to FIG. 21, a phase shifter 59 receives a perceptional-weighted synthesized signal candidate $x_1^{(i)}(n)$ of phase 1 output from a perceptional weighting filter 52, and can easily prepare every possible phase status for the index i by merely shifting the sample point of $x_1^{(i)}(n)$ in the forward direction of the time axis.

With $N_I$ being the number of index candidates in a code book 24 and $N_J$ being the number of phase candidates, the number of usage of the perceptional weighting filter 52 in FIG. 20 is in the order of $N_I \times N_J$ for a single search for an excitation signal, while the number of usage of the perceptional weighting filter 52 in FIG. 21 is in the order of $N_I$ for a single search for an excitation signal, i.e., the amount of calculation is reduced to approximately $1/N_J$.

A description will now be given of the ninth to twelfth embodiments which more specifically illustrate the density pattern selector 15 including its preprocessing portion. According to the above-described fifth to eighth embodiments, the prediction filter 14 has the long-term prediction filter 41 and short-term prediction filter 42 cascade-connected as shown in FIG. 17, and the prediction parameters are acquired by analysis of the input speech signal. According to the ninth to twelfth embodiments, however, the parameters of a long-term prediction filter and its inverse filter, a long-term synthesis filter, are acquired in a closed loop in such a way as to minimize the square mean difference between the input speech signal and the synthesized signal. With this structure, the parameters are acquired so as to minimize the error by the level of the synthesized signal, thus further improving the quality of the synthesized sound.

Figure 22:
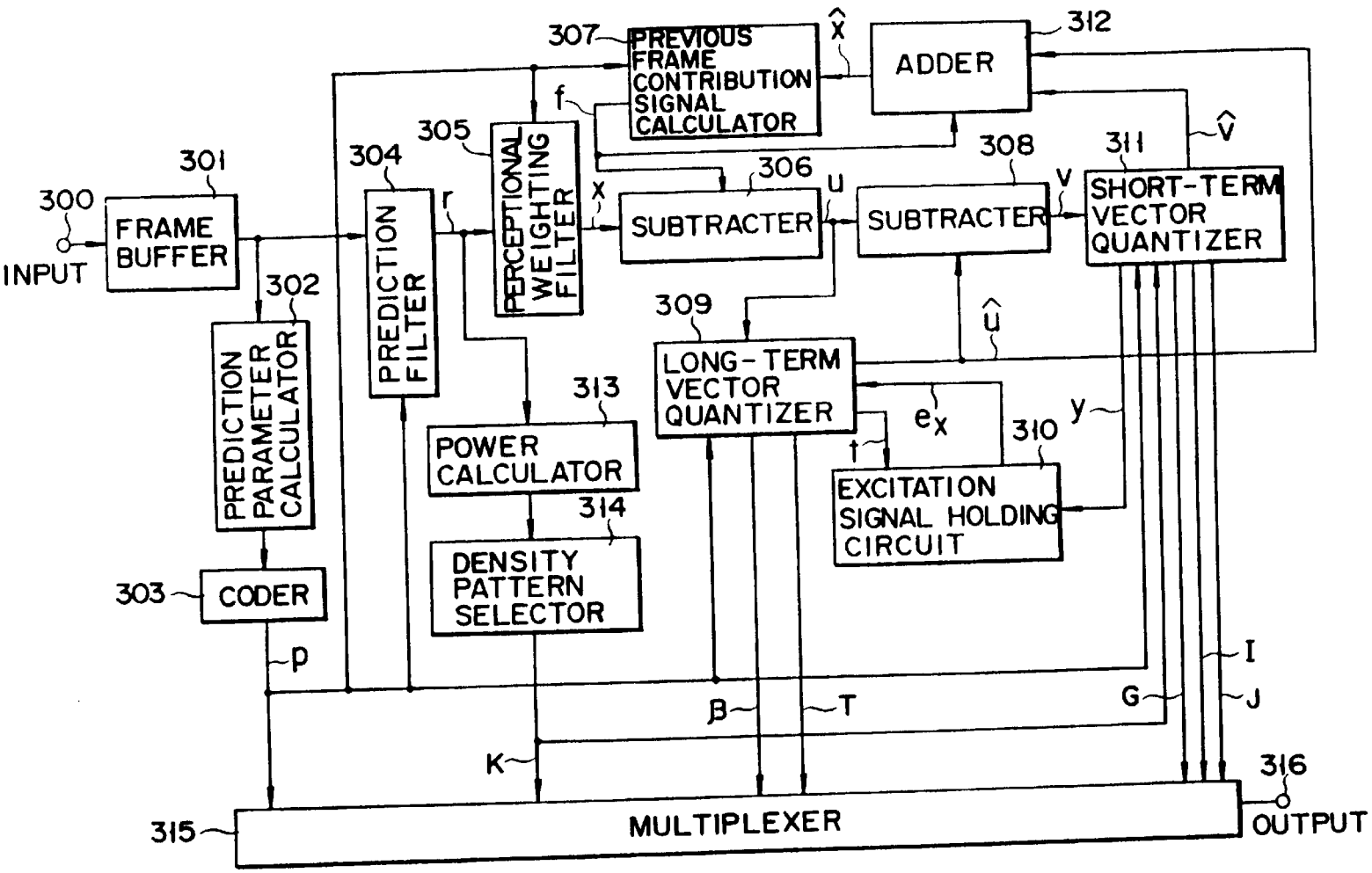
FIG. 22 is a block diagram of a coding apparatus according to the ninth embodiment of the present invention.
Figure 23:
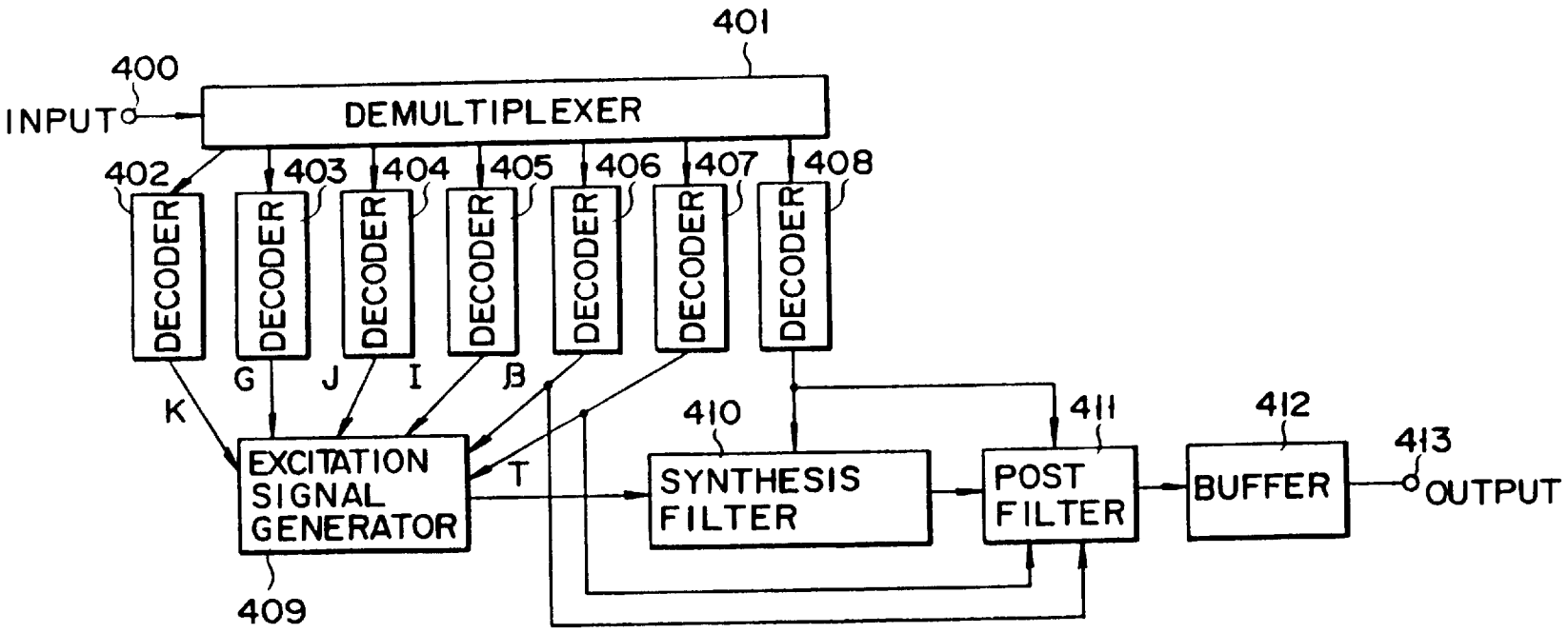
FIG. 23 is a block diagram of a decoding apparatus according to the ninth embodiment.

FIGS. 22 and 23 are block diagrams showing a coding apparatus and a decoding apparatus according to the ninth embodiment.

Referring to FIG. 22, a frame buffer 301 accumulates one frame of speech signal input to an input terminal 300. Individual blocks in FIG. 22 perform the following processes frame by frame or subframe by subframe using the frame buffer 301.

A prediction parameter calculator 302 calculates short-term prediction parameters to a speech signal for one frame using a known method. Normally, eight to twelve prediction parameters are calculated. The calculation method is described in, for example, the document 2. The calculated prediction parameters are sent to a prediction parameter coder 303, which codes the prediction parameters based on a predetermined number of quantization bits, and outputs the codes to a multiplexer 315, and sends a decoded value P to a prediction filter 304, a synthesis filter 305, an influence signal preparing circuit 307, a long-term vector quantizer (VQ) 309, and a short-term vector quantizer 311.

The prediction filter 304 calculates a prediction residual signal r from the input speech signal from the frame buffer 301 and the prediction parameter from the coder 303, then sends it to a perceptional weighting filter 305.

The perceptional weighting filter 305 obtains a signal x by changing the spectrum of the short-term prediction residual signal using a filter constituted based on the decoded value P of the prediction parameter and sends the signal x to a subtracter 306. This weighting filter 305 is for using the masking effect of perception and the details are given in the aforementioned document 2, so that its explanation will be omitted.

The influence signal preparing circuit 307 receives an old weighted synthesized signal $\hat{x}$ from an adder 312 and the decoded value P of the prediction parameter, and outputs an old influence signal f. Specifically, the zero input response of the perceptional weighting filter having the old weighted synthesized signal $\hat{x}$ as the internal status of the filter is calculated, and is output as the influence signal f for each preset subframe. As a typical value in a subframe at the time of 8-KHz sampling, about 40 samples, which is a quarter of one frame (160 samples), are used. The influence signal preparing circuit 307 receives the synthesized signal $\hat{x}$ of the previous frame prepared on the basis of the density pattern K determined in the previous frame to prepare the influence signal f in the first subframe. The subtracter 306 sends a signal u acquired by subtracting the old influence signal f from the audibility-weighted input signal x, to a subtracter 308 and the long-term vector quantizer 309 subframe by subframe.

A power calculator 313 calculates the power (square sum) of the short-term prediction residual signal, the output of the prediction filter 304, subframe by subframe, and sends the power of each subframe to a density pattern selector 314.

The density pattern selector 314 selects one of preset density patterns of the excitation signal based on the power of the short-term prediction residual signal for each subframe output from the power calculator 315. Specifically, the density pattern is selected in such a manner that the density increases in the order of subframes having greater power. For instance, with four subframes having an equal length, two types of densities, and the density patterns set as shown in the following table, the density pattern selector 314 compares the powers for the individual subframes to select the number K of that density pattern for which the subframe with the maximum power is dense, and sends it as density pattern information to the short-term vector quantizer 311 and the multiplexer 315.

TABLE 1

| | Subframe Number | | | |
|---|---|---|---|---|
| Pattern Number K | 1 | 2 | 3 | 4 |
| 1 | Dense | Sparse | Sparse | Sparse |
| 2 | Sparse | Dense | Sparse | Sparse |
| 3 | Sparse | Sparse | Dense | Sparse |
| 4 | Sparse | Sparse | Sparse | Dense |

The long-term vector quantizer 309 receives the difference signal u from the subtracter 306, an old excitation signal ex from an excitation signal holding circuit 310 to be described later, and the prediction parameter P from the coder 303, and sends a quantized output signal û of the difference signal u to the subtracter 308 and the adder 312, the vector gain β and index T to the multiplexer 315, the long-term excitation signal t to the excitation signal holding circuit 310 subframe by subframe. At this time, t and û have a relation û=t * h (h is the impulse response of the perceptional weighting filter 305, and * represents the convolution).

A detailed description will now be given of an example of how to acquire the vector gain $\beta^{(m)}$ and index $T^{(m)}$ (m: subframe number) for each subframe.

The excitation signal candidate for the present subframe is prepared using preset index T and gain β, is sent to the perceptional weighting filter to prepare a candidate of the quantized signal of the difference signal u, then the optimal index $T^{(m)}$ and optimal $\beta^{(m)}$ are determined so as to minimize the difference between the difference signal u and the candidate of the quantized signal. At this time, let t be the excitation signal of the present subframe to be prepared using $T^{(m)}$ and optimal $\beta^{(m)}$, and let the signal acquired by inputting t to the perceptional weighting filter be the quantized output signal û of the difference signal u.

As a similar method, a known method similar to the method of acquiring the coefficient of the pitch predictor in the closed loop as disclosed in, for example, the paper titled "A Class of Analysis-by-synthetic Predicative Coders for High Quality Speech Coding at Rates Between 4.8 and 16 kbits/s," by Peter Kroon et al. the IEEE report, February 1988, Vol. SAC-6, pp. 353–363 (document 6) can be employed. Therefore, its explanation will be omitted here.

The subtracter 308 sends the difference signal V acquired by subtracting the quantized output signal û from the difference signal u, to the short-term vector quantizer 311 for each subframe.

The short-term vector quantizer 311 receives the difference signal V, the prediction parameter P, and the density pattern number K output from the density pattern selector 314, and sends the quantized output signal $\hat{V}$ of the difference signal V to the adder 312, and the short-term excitation signal y to the excitation signal holding circuit 310. Here $\hat{V}$ and y have a relation $\hat{V}$=y * h.

The short-term vector quantizer 311 also sends the gain G and phase information J of the excitation pulse train, and index I of the code vector to the multiplexer 315. Since the pulse number $N^{(m)}$ corresponding to the density (pulse interval) of the present subframe (m-th subframe) determined by the density pattern number K should be coded within the subframe, the parameters G, J, and I, which are to be output subframe by subframe, are output for a number corresponding to the order number $N_D$ of a preset code vector (the number of pulses constituting each code vector), i.e., $N^{(m)}/N_D$, in the present subframe.

Suppose that the frame length is 160 samples, the subframe is constituted of 40 samples with the equal length, and the order of the code vector is 20. In this case, when one of predetermined density patterns has the pulse interval 1 of the first subframe and the pulse interval 2 of the second to fourth subframes, the number of each of the gains, phases, and indexes output from the short-term vector quantizer 311 would be 40/20=2 for the first subframe (in this case no phase information is output because the pulse interval is 1), and 20/20=1 for the second to fourth subframes.

Figure 24:
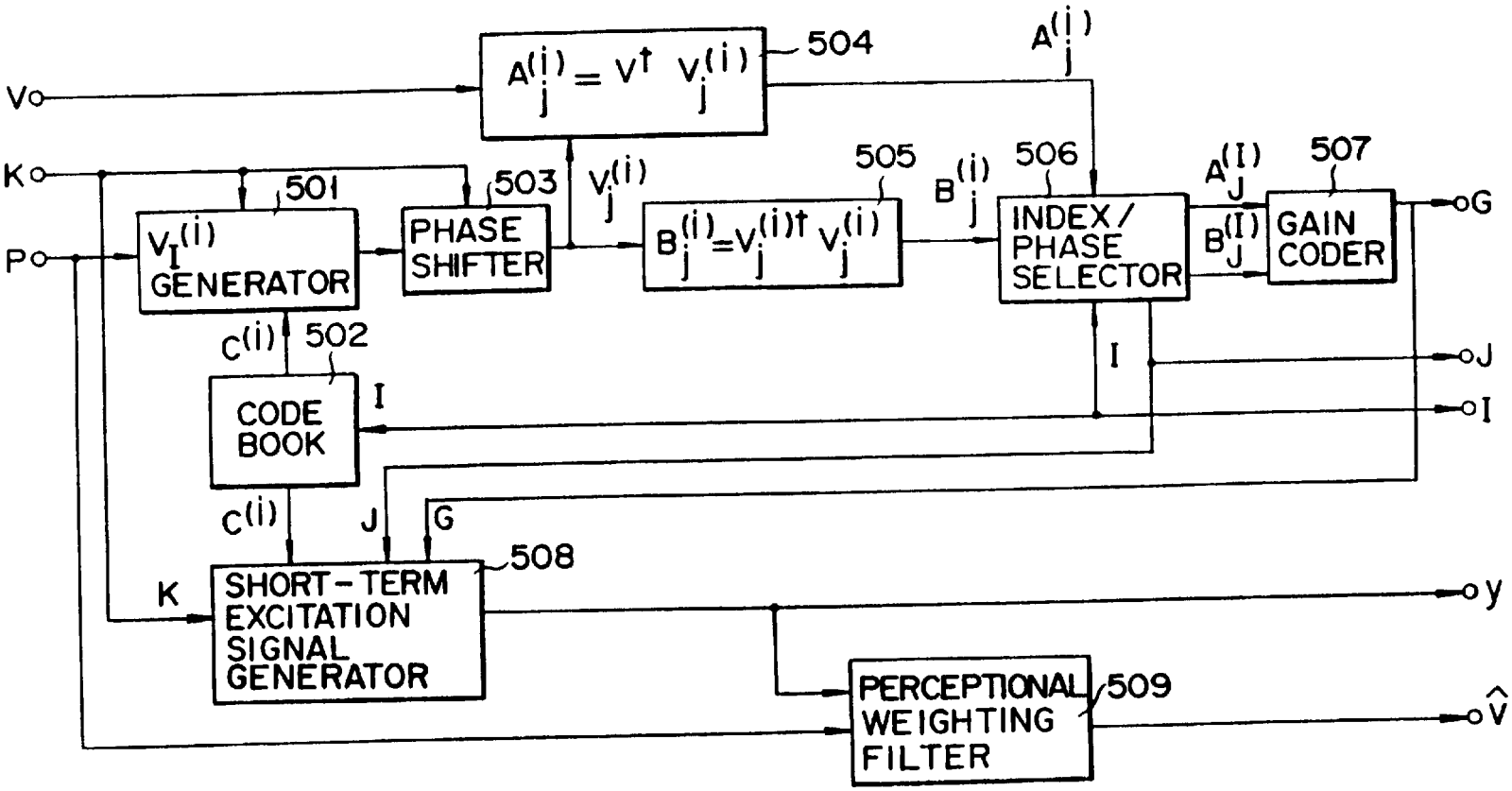
FIG. 24 is a detailed block diagram of a short-term vector quantizer in the coding apparatus according to the ninth embodiment.

FIG. 24 exemplifies a specific structure of the short-term vector quantizer 311. In FIG. 24, a synthesized vector generator 501 produces a train of pulses having the density information by interpolating periodically a predetermined number of zeros after the first sample of $C^{(i)}$ (i: index of the code vector) so as to have a pulse interval corresponding to the density pattern information K based on the prediction parameter P, the code vector $C^{(i)}$ in a preset code book 502, and density pattern information K, and synthesizes this pulse train with the perceptional weighting filter prepared from the prediction parameter P to thereby generate a synthesized vector $V1^{(i)}$.

A phase shifter 503 delays this synthesized vector $V_1^{(i)}$ by a predetermined number of samples based on the density pattern information K to produce synthesized vectors $V_2^{(i)}$, $V_3^{(i)}$, . . . $V_j^{(i)}$ having difference phases, then outputs them to an inner product calculator 504 and a power calculator 505. The code book 502 comprises a memory circuit or a vector generator capable of storing amplitude information of the proper density pulse and permitting output of a predetermined code vector $C^{(i)}$ with respect to the index i. The inner product calculator 504 calculates the inner product, $Aj^{(i)}$, of the difference signal V from the subtracter 308 in FIG. 22 and the synthesized vector $V_j^{(i)}$, and sends it to an index/phase selector 506. The power calculator 505 acquires the power, $B_j^{(i)}$, of the synthesized vector $V_j^{(i)}$, then sends it to the index/phase selector 306.

The index/phase selector 306 selects the phase J and index I which maximize the evaluation value of the following equation using the inner product $A_j^{(i)}$ and the power $B_j^{(i)}$ $$\{A_j^{(i)}\}^2/B_j^{(i)} \tag{53}$$

from the phase candidates j and index candidates i, and sends the corresponding pair of the inner product $A_J^{(I)}$ and the power $B_J^{(I)}$ to a gain coder 507. The index/phase selector 506 further sends the information of the phase J to a short-term excitation signal generator 508 and the multiplexer 315 in FIG. 22, and sends the information of the index I to the code book 502 and the multiplexer 315 in FIG. 22.

The gain coder 507 codes the ratio of the inner product $A_J^{(I)}$ to the power $B_J^{(I)}$ from the index/phase selector 506

$$A_J^{(i)}/B_J^{(I)} \ldots \tag{54}$$

by a predetermined method, and sends the gain information G to the short-term excitation signal generator 508 and the multiplexer 315 in FIG. 22.

As the above equations (53) and (54), those proposed in the paper titled "EFFICIENT PROCEDURES FOR FINDING THE OPTIMUM INNOVATION IN STOCHASTIC CODERS" by I. M. Trancoso et al., International Conference on Acoustic, Speech and Signal Processing (Document 4) may be employed.

A short-term excitation signal generator 508 receives code vector $C^{(I)}$ corresponding to the density pattern information K, gain information G, phase information J, and the index I. Using K and $C^{(I)}$, the generator 508 generates a train of pulses with density information in the same manner as described with reference to the synthesized vector generator 501. The pulse amplitude is multiplied by the value corresponding to the gain information G, and the pulse train is delayed by a predetermined number of samples based on the phase information J, so as to generate a short-term excitation signal y. The short-term excitation signal y is sent to a perceptional weighting filter 509 and the excitation signal holding circuit 310 shown in FIG. 22. The perceptional weighting filter 509 with the same property as the perceptional weighting filter 305 shown in FIG. 22, is formed based on the prediction parameter P. The filter 509 receives the short-term excitation signal y, and sends the quantizing output $\hat{V}$ of the differential signal V to the adder 312 shown in FIG. 22.

Coming back to the description of FIG. 22, the excitation signal holding circuit 310 receives the long-term excitation signal t sent from the long-term vector quantizer 309 and the short-term excitation signal y sent from the short-term vector quantizer 311, and supplies an excitation signal ex to the long-term vector quantizer 309 subframe by subframe. Specifically, the excitation signal ex is obtained by merely adding the signal t to the signal y sample by sample for each subframe. The excitation signal ex in the present subframe is stored in a buffer memory in the excitation signal holding circuit 330 so that it will be used as the old excitation signal in the long-term quantizer 309 for the next subframe.

The adder 312 acquires, subframe by subframe, a sum signal x of the quantized outputs $\hat{u}^{(m)}$, $\hat{V}^{(m)}$, and the old influence signal f prepared in the present subframe, and sends the signal $\hat{x}$ to the influence signal preparing circuit 307.

The information of the individual parameters P, β, T, G, I, J, and K acquired in such a manner are multiplexed by the multiplexer 315, and transmitted as transfer codes from an output terminal 316.

The description will now be given of the decoding apparatus shown in FIG. 23, which decodes the codes from the coding apparatus in FIG. 22.

In FIG. 23, the transmitted code is input to an input terminal 400. A demultiplexer 401 separates this code into codes of the prediction parameter, density pattern information K, gain β, gain G, index T, index I, and phase information J. Decoders 402 to 407 decode the codes of the density pattern information K, the gain G, the phase information J, the index I, the gain β, and the index T, and supply them to an excitation signal generator 409. Another decoder 408 decodes the coded prediction parameter, and sends it to a synthesis filter 410. The excitation signal generator 409 receives each decoded parameter, and generates an excitation signal of the different densities, subframe by subframe, based on the density pattern information K.

Figure 25:
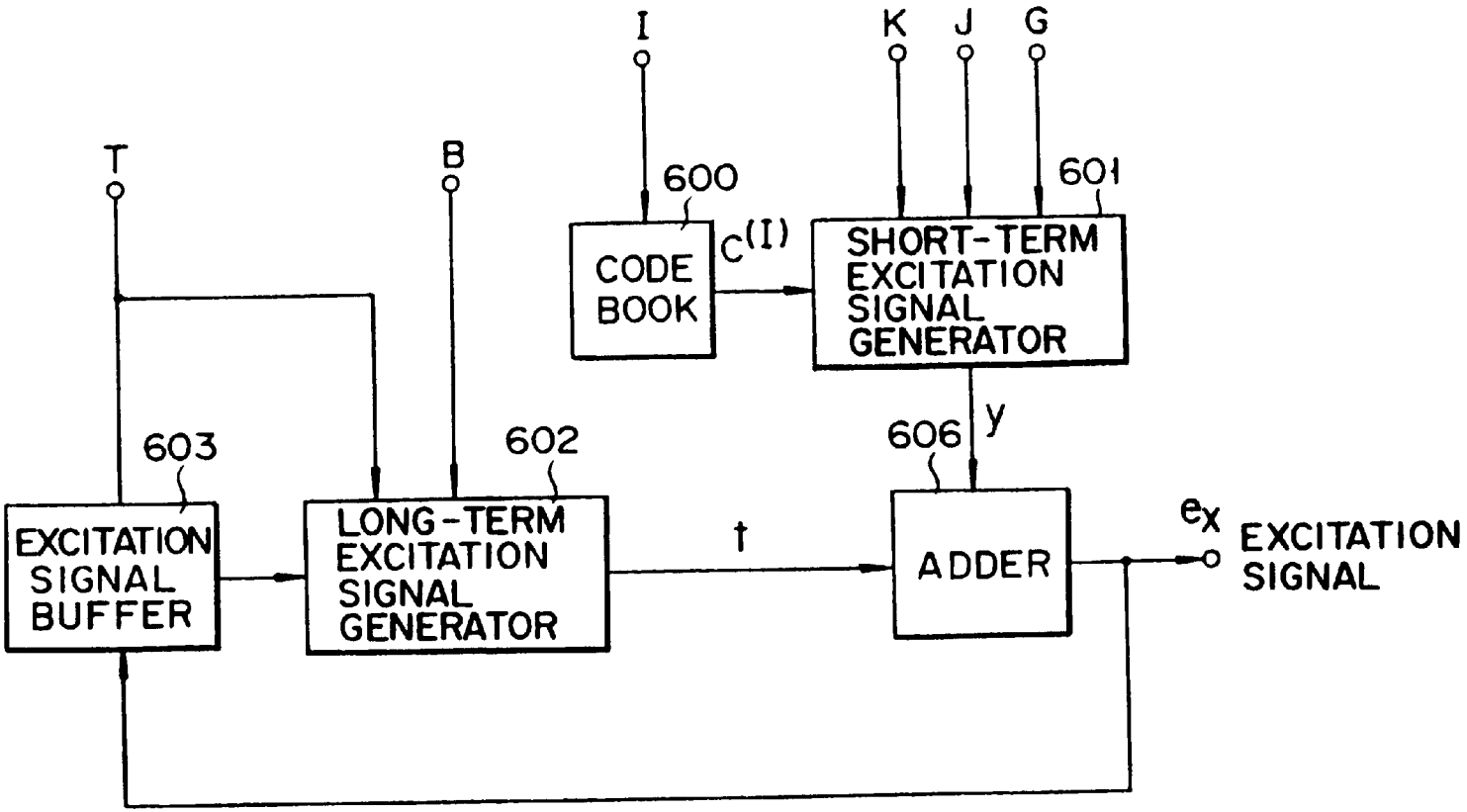
FIG. 25 is a detailed block diagram of an excitation signal generator in the decoding apparatus according to the ninth embodiment.

Specifically, the excitation signal generator 409 is structured as shown in FIG. 25, for example. In FIG. 25, a code book 600 has the same function as the code book 502 in the coding apparatus shown in FIG. 24, and sends the code vector $C^{(I)}$ corresponding to the index I to a short-term excitation signal generator 601. The excitation signal generator 601, which has the same function as the short-term excitation signal generator 308 of the coding apparatus illustrated in FIG. 24, receives the density pattern information K, the phase information J, and the gain G, and sends the short-term excitation signal y to an adder 606. The adder 606 sends a sum signal of the short-term excitation signal y and a long-term excitation signal t generated in a long-term excitation signal generator 602, i.e., an excitation signal ex, to an excitation signal buffer 603 and the synthesis filter 410 shown in FIG. 23.

The excitation signal buffer 603 holds the excitation signals output from the adder 606 by a predetermined number of old samples backward from the present time, and upon receiving the index T, it sequentially outputs the excitation signals by the samples equivalent to the subframe length from the T-sample old excitation signal. The long-term excitation signal generator 602 receives a signal output from the excitation signal buffer 603 based on the index T, multiplies the input signal by the gain β, generates a long-term excitation signal repeating in a T-sample period, and outputs the long-term excitation signal to the adder 606 subframe by subframe.

Returning to FIG. 23, the synthesis filter 410 has a frequency response opposite to the one of the prediction filter 304 of the coding apparatus shown in FIG. 22. The synthesis filter 410 receives the excitation signal and the prediction parameter, and outputs the synthesized signal.

Using the prediction parameter, the gain β, and the index T, a post filter 411 shapes the spectrum of the synthesized signal output from the synthesis filter 410 so that noise may be subjectively reduced, and supplies it to a buffer 412. The post filter may specifically be formed, for example, in the manner described in the document 3 or 4. Further, the output of the synthesis filter 410 may be supplied directly to the buffer 412, without using the post filter 411. The buffer 412 synthesizes the received signals frame by frame, and sends a synthesized speech signal to an output terminal 413.

According to the above-described embodiment, the density pattern of the excitation signal is selected based on the power of the short-term prediction residual signal; however, it can be done based on the number of zero crosses of the short-term prediction residual signal. A coding apparatus according to the tenth embodiment having this structure is illustrated in FIG. 26.

Figure 26:
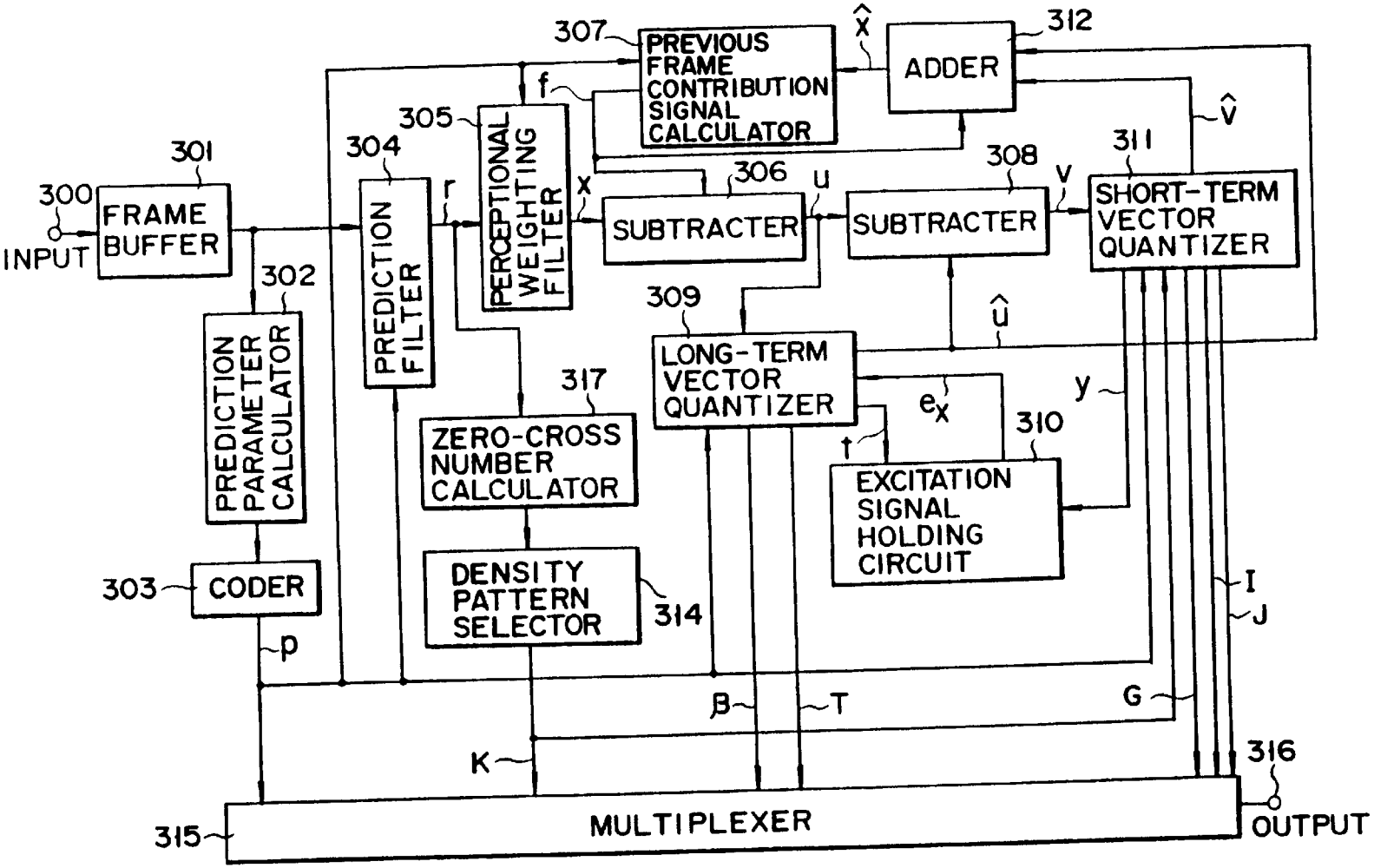
FIG. 26 is a block diagram of a coding apparatus according to the tenth embodiment of the present invention.

In FIG. 26, a zero-cross number calculator 317 counts, subframe by the subframe, how many times the short-term prediction residual signal r crosses "0", and supplies that value to a density pattern selector 314. In this case, the density pattern selector 314 selects one density pattern among the patterns previously set in accordance with the zero-cross numbers for each subframe.

Figure 27:
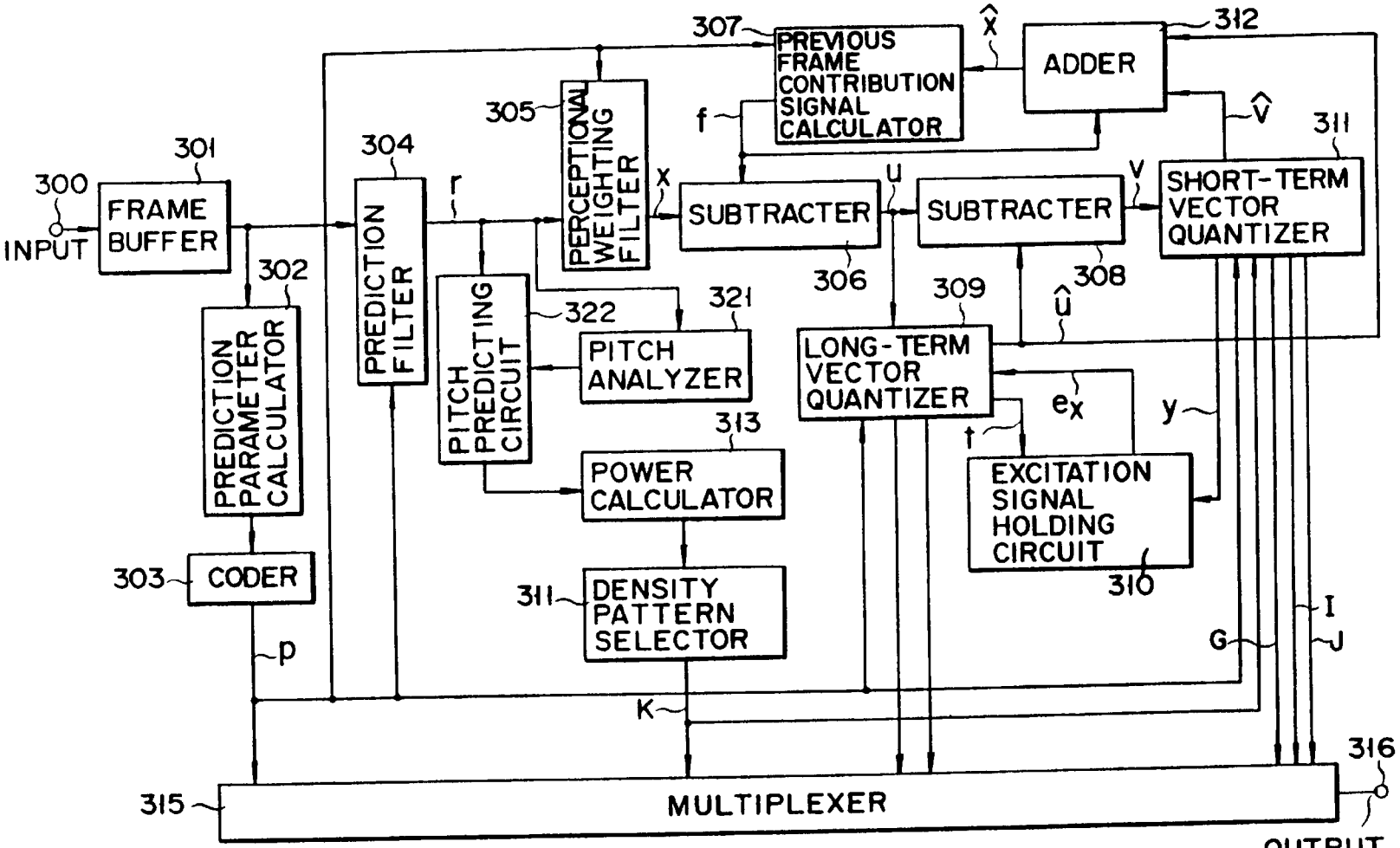
FIG. 27 is a block diagram of a coding apparatus according to the eleventh embodiment of the present invention.
Figure 28:
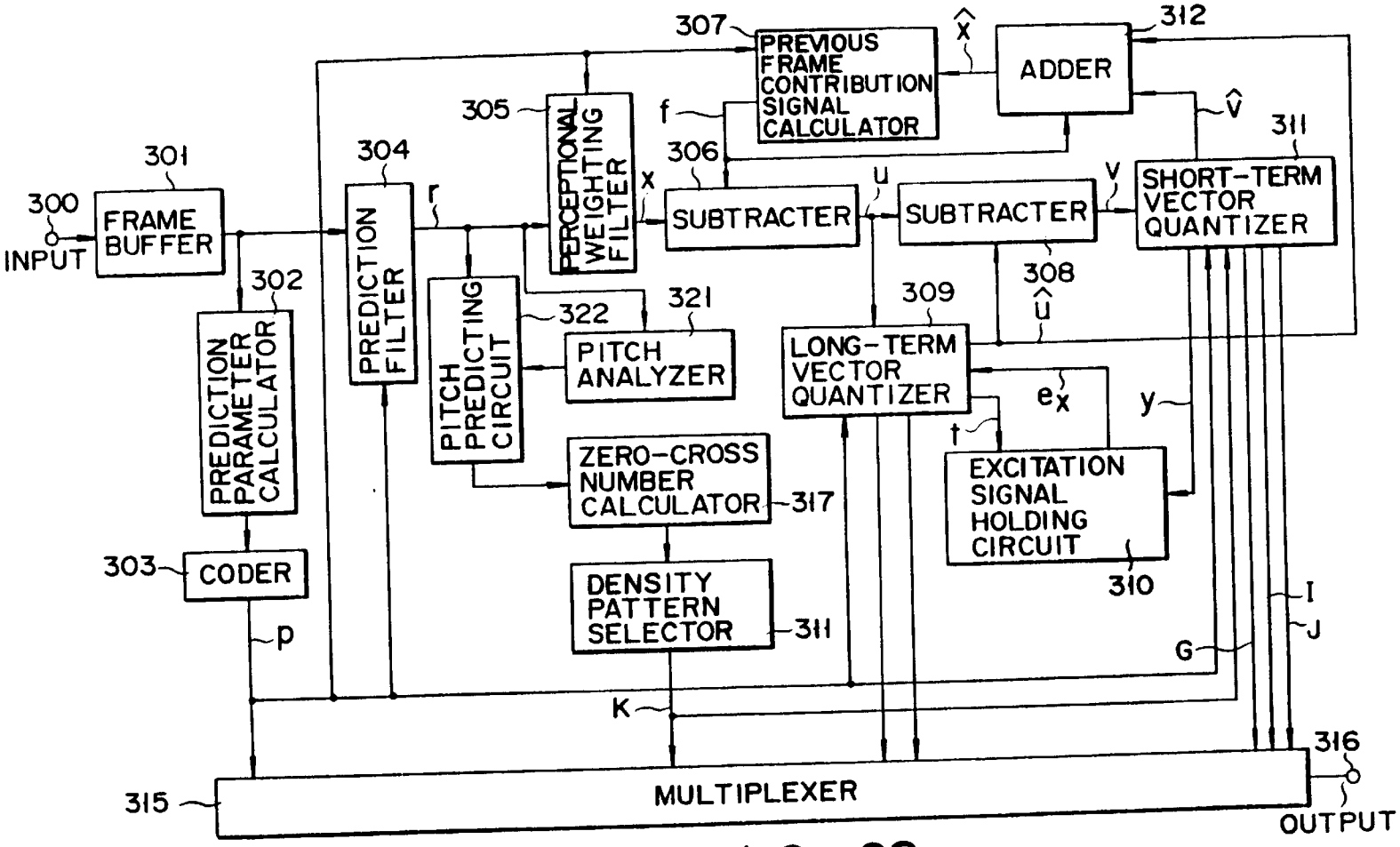
FIG. 28 is a block diagram of a coding apparatus according to the twelfth embodiment of the present invention.

The density pattern may be selected also based on the power or the zero-cross numbers of a pitch prediction residual signal acquired by applying pitch prediction to the short-term prediction residual signal. FIG. 27 is a block diagram of a coding apparatus of the eleventh embodiment, which selects the density pattern based on the power of the pitch prediction residual signal. FIG. 28 presents a block diagram of a coding apparatus of the twelfth embodiment, which selects the density pattern based on the zero-cross numbers of the pitch prediction residual signal. In FIGS. 27 and 28, a pitch analyzer 321 and a pitch prediction filter 322 are located respectively before the power calculator 313 and the zero-cross number calculator 317 which are shown in FIGS. 22 and 26. The pitch analyzer 321 calculates a pitch cycle and a pitch gain, and outputs the calculation results to the pitch prediction filter 322. The pitch prediction filter 322 sends the pitch prediction residual signal to the power calculator 313, or the zero-cross number calculator 317. The pitch cycle and the pitch gain can be acquired by a well-known method, such as the autocorrelation method, or covariance method.

Figure 29:
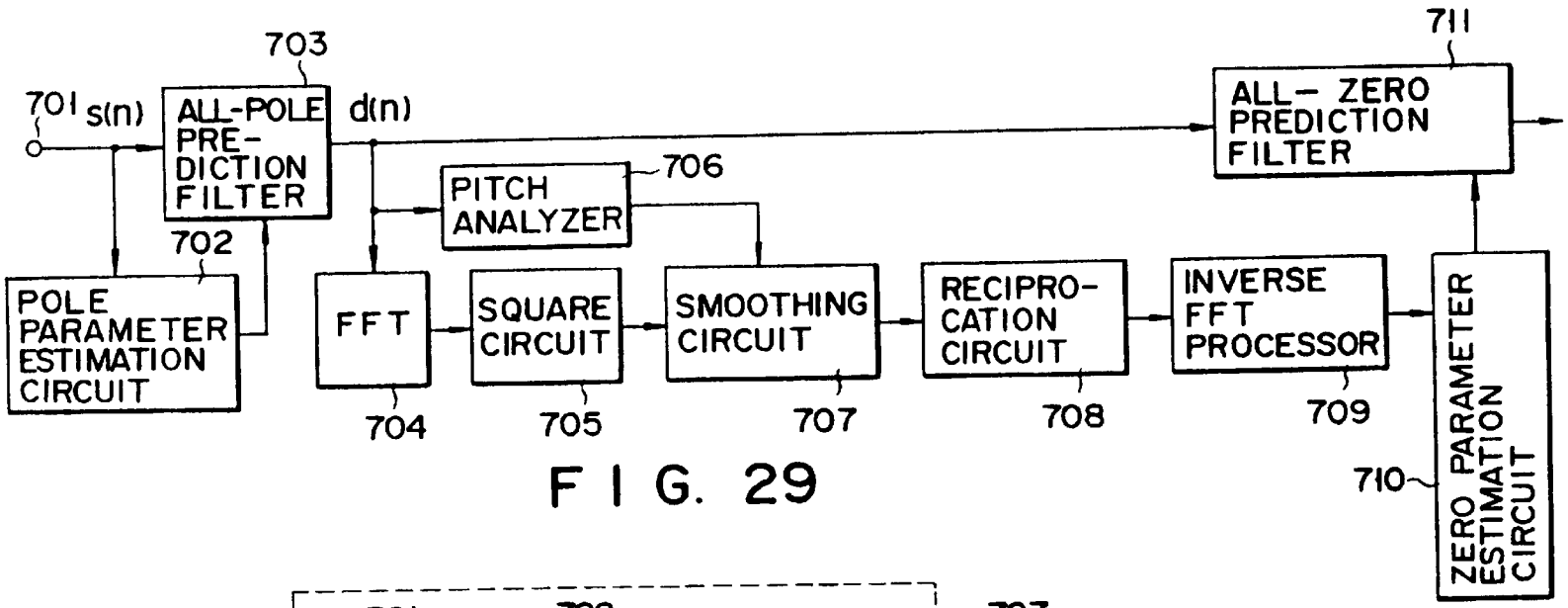
FIG. 29 is a block diagram of a zero pole model constituting a prediction filter and synthesis filter.

A zero-pole prediction analyzing model will now be described as an example of the prediction filter or the synthesis filter. FIG. 29 is a block diagram of the zero-pole model. Referring to FIG. 29, a speech signal s(n) is received at a terminal 701, and supplied to a pole parameter predicting circuit 702. There are several known methods of predicting a pole parameter; for example, the autocorrelation method may be used which is disclosed in the above-described document 2. The input speech signal is sent to an all-pole prediction filter (LPC analysis circuit) 703 which has the pole parameter obtained in the pole parameter estimation circuit 702. A prediction residual signal d(n) is calculated herein according to the following equation, and output.

$$d(n) = s(n) - \sum_{i=1}^{D} a_i \cdot s(n-i) \tag{55}$$

where s(n) is an input signal series, ai a parameter of the all-pole model, and p an order of estimation.

The power spectrum of the prediction residual signal d(n) is acquired by a fast Fourier transform (FFT) circuit 704 and a square circuit 705, while the pitch cycle is extracted and the voiced/unvoiced of a speech is determined by a pitch analyzer 706. Instead of the FFT circuit 704, a discrete Fourier transform (DFT) may be used. Further, a modified correlation method disclosed in the document 2 may be employed as the pitch analyzing method.

The power spectrum of the residual signal, which has been acquired in the FFT circuit 704 and the square circuit 705, is sent to a smoothing circuit 707. The smoothing circuit 707 smoothes the power spectrum with the pitch cycle and the state of the voiced/unvoiced of the speech, both acquired in the pitch analyzer 706, as parameters.

Figure 30:
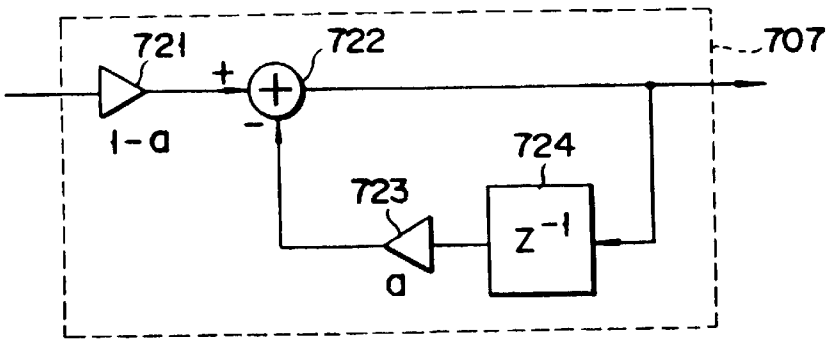
FIG. 30 is a detailed block diagram of a smoothing circuit in FIG. 29.

The details of the smoothing circuit 707 are illustrated in FIG. 30. The time constant of this circuit, i.e., the sample number T which makes the impulse response to 1/e, is expressed as follows:

$$T=-1/1n(\alpha) \tag{56}$$

The time constant T is properly changed in accordance with the value of the pitch cycle. With $T_p$ (sample) being the pitch cycle, $f_s$ (Hz) being a sampling frequency, and N being an order of the FFT or the DFT, the following equation represents a cycle m (sample) in a fine structure by the pitch which appears in the power spectrum of the residual signal:

$$m = (f_s/T_p)\cdot(N/f_s) = N/T_p \tag{57}$$

To properly change the time constant T according to m, substituting the equation (56) to $T=N/T_p$ and solving it for $\alpha$, which is defined as follows:

$$\alpha=1/\exp(T_p/N\cdot L) \tag{58}$$

where L is a parameter indicating the number of fine structures to do smoothing. Since there is no $T_p$ acquired with the silent speech, $T_p$ is set at the proper value determined in advance when the pitch analyzer 706 determines that the speech is silent.

Further, in smoothing the power spectrum by a filter shown in FIG. 30, the filter shall be set to have a zero phase. To realize the zero phase, for example, the power spectrum is filtered forward and backward and the respectively acquired outputs have only to be averaged. With $D(n\omega_o)$ being the power spectrum of the residual signal, $\underline{D}(n\omega_o)f$ being the filter output when the forward filter is executed, and $\underline{D}(n\omega_o)_b$ being the filter output for the backward filtering, the smoothing is expressed as follows.

$$\underline{D}(n\omega_o)_f=(1-\alpha)\cdot D(n\omega_o)+\alpha\cdot\underline{D}\{(n-1)\omega_o\} \tag{59}$$

$$D\{(N-n)\omega_o)_b=(1-\alpha)\cdot D\{(N-n+1)\omega_o)+\alpha\cdot\underline{D}\{(N-n+1)\omega_o\} \tag{60}$$

$$\overline{D}(n\omega_o)=(½)\}D(n\omega_o)_f+\overline{D}(n\omega_o)_b\} \tag{61}$$

(n=0, 1, . . . N−1)

$$\omega_o=2\pi/N \tag{62}$$

where $\underline{D}(n\omega_o)$ is the smoothed power spectrum, and N is the order of FFT or DFT.

The spectrum smoothed by the smoothing circuit 707 is transformed into the reciprocal spectrum by a reciprocation circuit 708. As a result, the zero point of the residual signal spectrum is transformed to a pole. The reciprocal spectrum is subjected to inverse FFT by an inverse FFT processor 709 to be transformed into an autocorrelation series, which is input to an all-zero parameter estimation circuit 710.

The all-zero parameter estimation circuit 710 acquires an all-zero prediction parameter from the received autocorrelation series using the self autocorrelation method. An all-zero prediction filter 711 receives a residual signal of an all-pole prediction filter, and makes prediction using the all-zero prediction parameter acquired by the all-zero parameter estimation circuit 710, and outputs a prediction residual signal e(n), which is calculated according to the following equation.

$$e(n) = d(n) - \sum_{i=1}^{Q} b_i \cdot e(n-i) \tag{63}$$

where bi is the zero prediction parameter, and Q is the order of the zero prediction.

Through the above processing, the zero pole predicative analysis is executed.

Figure 31:
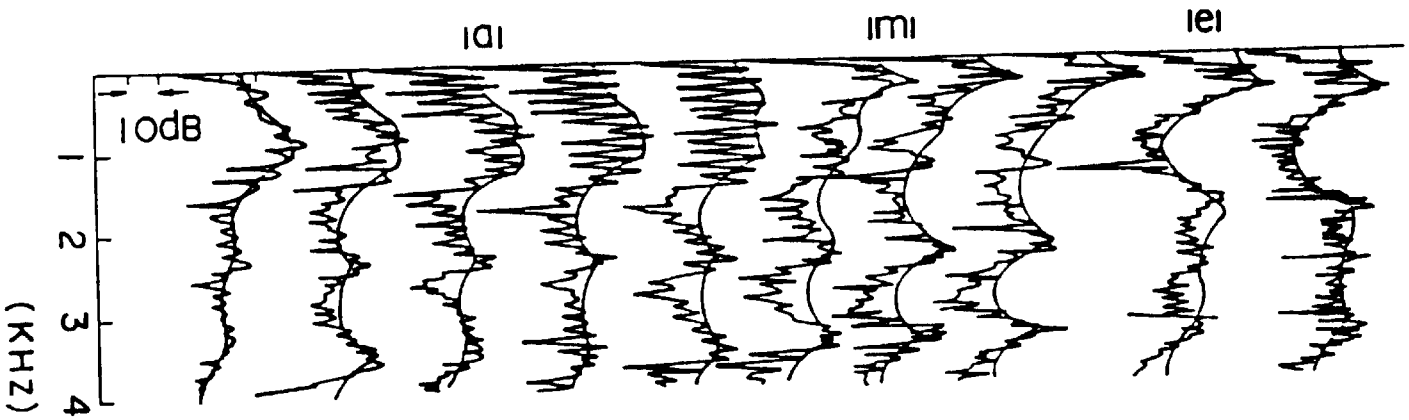
FIGS. 31 and 32 are diagrams showing the frequency response of the zero pole model in FIG. 29 compared with the prior art.
Figure 32:
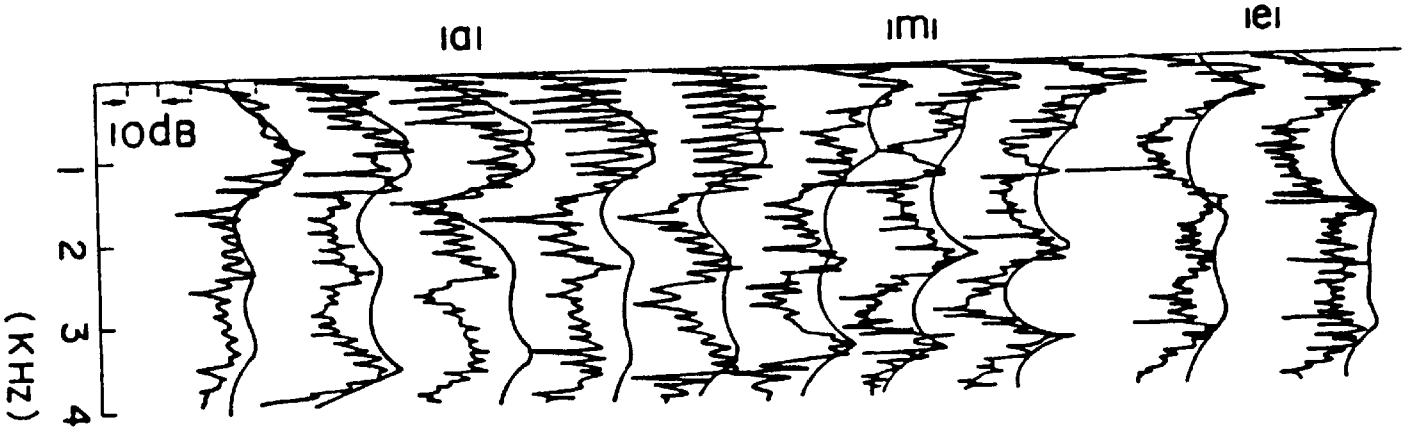

The following shows the results of experiments on real sounds. FIG. 31 shows the result of analyzing "AME" voiced by an adult. FIG. 32 presents spectrum waveforms in a case where no smoothing is executed. As should be apparent from these diagrams, when no smoothing is carried out, false zero point or emphasized zero point would appear on the spectrum of the zero pole model, degrading the approximation of the spectrum and resulting in an erroneous prediction of zero parameters. However, the parameters can always be extracted without errors and without being affected by the fine structure of the spectrum by smoothing the power spectrum of the residual signal in a frequency region by means of a filter, which adaptively changes the time constant in accordance with the pitch, then providing the inverse spectrum and extracting the zero parameters.

The smoothing circuit 707 shown in FIG. 29 may be replaced with a method of detecting the peaks of the power spectrum and interpolating between the detected peaks by a curve of the second order. Specifically, coefficients of a quadratic equation which passes three peaks, and between two peaks is interpolated by that curve of the second order. In this case, the pitch analysis is unnecessary, thus reducing the amount of calculation.

Figure 33:
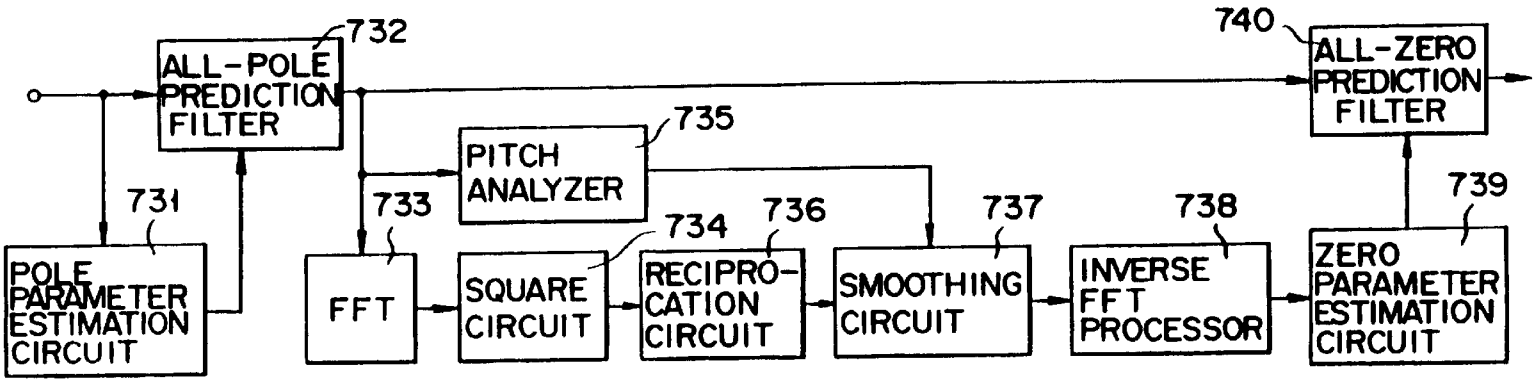
FIGS. 33 to 36 are block diagrams of other zero pole models.

The smoothing circuit 707 shown in FIG. 29 may be inserted next to the inverse circuit 708; FIG. 33 presents a block diagram in this case.

The smoothing in FIGS. 29 and 33 done in the frequency region may be executed in the time region with $D'(n\omega_o)$, (n=0, 1, . . . N−1) being the inverse of the power spectrum of the residual signal d(n), and h(n) and $H(n\omega_o)$ respectively being the impulse response and the transfer function of a digital filter shown in FIG. 30, the smoothing is executed by the filtering in the frequency domain as expressed by the following equations.

$$\overline{D}(n\omega_o) = \sum_{i=1}^{\infty} D'(n\omega_o) \cdot h(n-i) \tag{64}$$

$$\omega_o = 2\pi / N \tag{65}$$

where $\overline{D}(n\omega_o)$ is the smoothed power spectrum. Let $\overline{\gamma}(n)$ and $\gamma'(n)$ be the inverse Fourier transform of $\overline{D}(n\omega_o)$ and $D'(n\omega_o)$, respectively. Then, the equation (64) is expressed by the following equation in the time domain due to the property of the Fourier transform.

$$\overline{\gamma}(n) = \gamma'(n) \cdot H(n\omega_o) \tag{66}$$

In other words, it is equivalent to putting a window $H(n\omega_o)$. $H(n\omega_o)$ at this time is called a lag window. $H(n\omega_o)$ adaptively varies in accordance with the pitch period.

Figure 34:
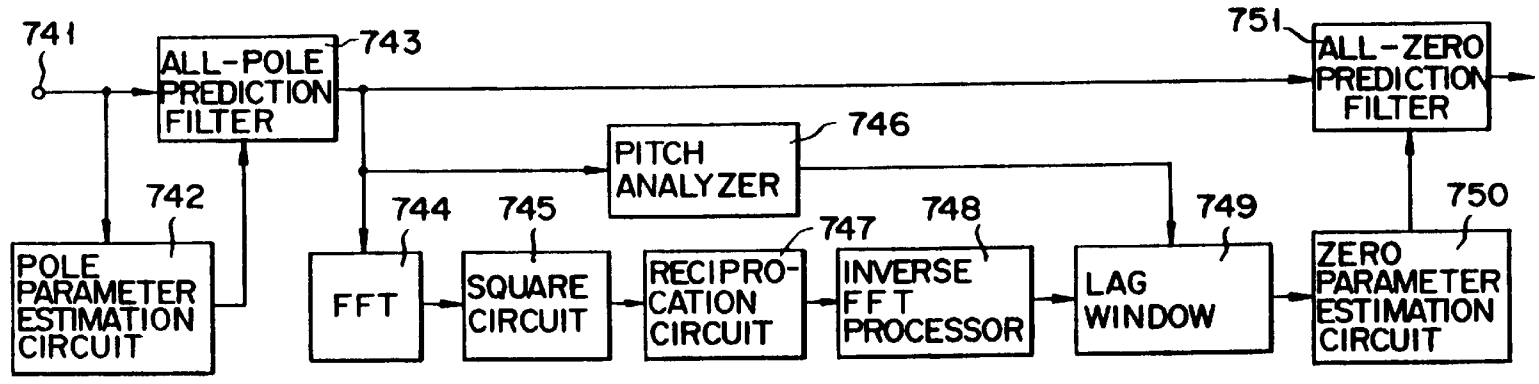

FIG. 34 is a block diagram in a case of performing the smoothing in the time domain.

Although zero points are transformed into poles in the frequency domain in the examples shown in FIGS. 29, and 34, this may be executed in the time domain. With $\gamma(n)$ being the autocorrelation series of the residual signal d(n) of polar prediction and $D(n\omega_o)$ being its Fourier transform or the power spectrum, $D(n\omega_o)$ and its inversion $D'(n\omega_o)$ have the following relation.

$$D(n\omega_o) \cdot D'(n\omega_o) = 1 \tag{67}$$

Because of the property of the Fourier transform, the above equation is expressed as follows in the time domain.

$$\gamma(n) = \sum_{i=0}^{N-1} \gamma(i) \cdot \gamma'(n-i) = \delta(n - n_o) \tag{68}$$

$$(n_o = 0)$$

Since the autocorrelation coefficient is symmetrical to $\gamma(0)$, the equation (68) can be written in a matrix form as follows.

$$\begin{bmatrix} \gamma(0) & \gamma(1) & & \cdots & \gamma(N-1) \\ \gamma(1) & \gamma(0) & \gamma(1) & \cdots & \gamma(N-2) \\ \gamma(2) & \gamma(1) & \gamma(0) & \cdots & \gamma(N-3) \\ & & \vdots & & \\ \gamma(N-1) & \gamma(N-2) & & \cdots & \gamma(0) \end{bmatrix} \begin{bmatrix} \gamma'(0) \\ \gamma'(1) \\ \gamma'(2) \\ \vdots \\ \gamma'(N-1) \end{bmatrix} = \begin{bmatrix} 1 \\ 0 \\ 0 \\ \vdots \\ 0 \end{bmatrix} \tag{69}$$

This equation can be solved recurrently by the Levinson algorithm. This method is disclosed in, for example Linear Statistical Models for Stationary Sequences and Related Algorithms for Cholesky Factorization of Toeplitz Matrices; IEEE Transactions on Accoustics, Speech, and Signal Processing, Vol. ASSP-35, No. 1, January 1987, pp. 29–42.

Figure 35:
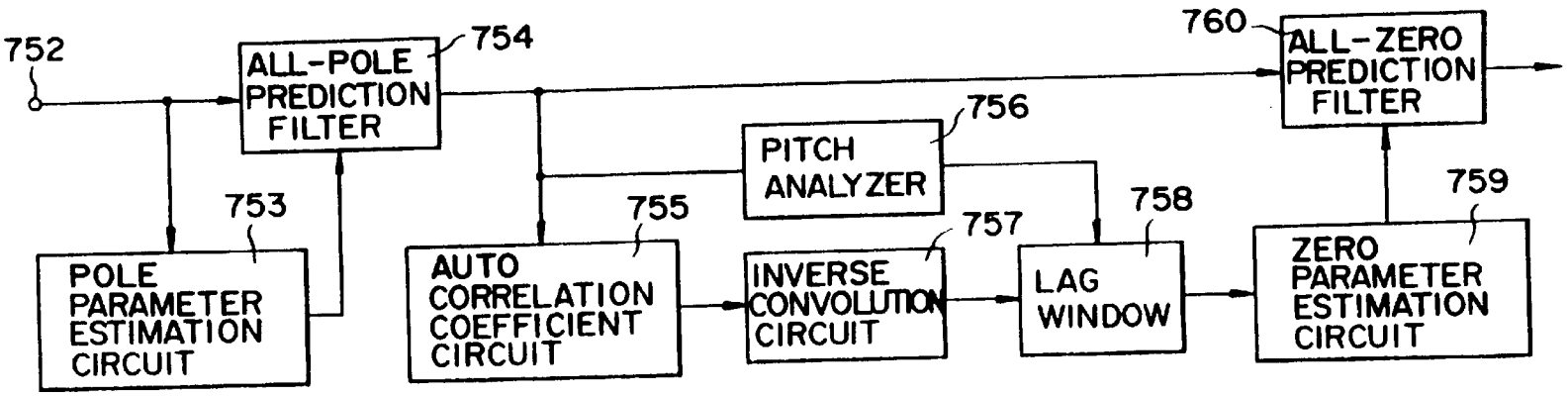
Figure 36:
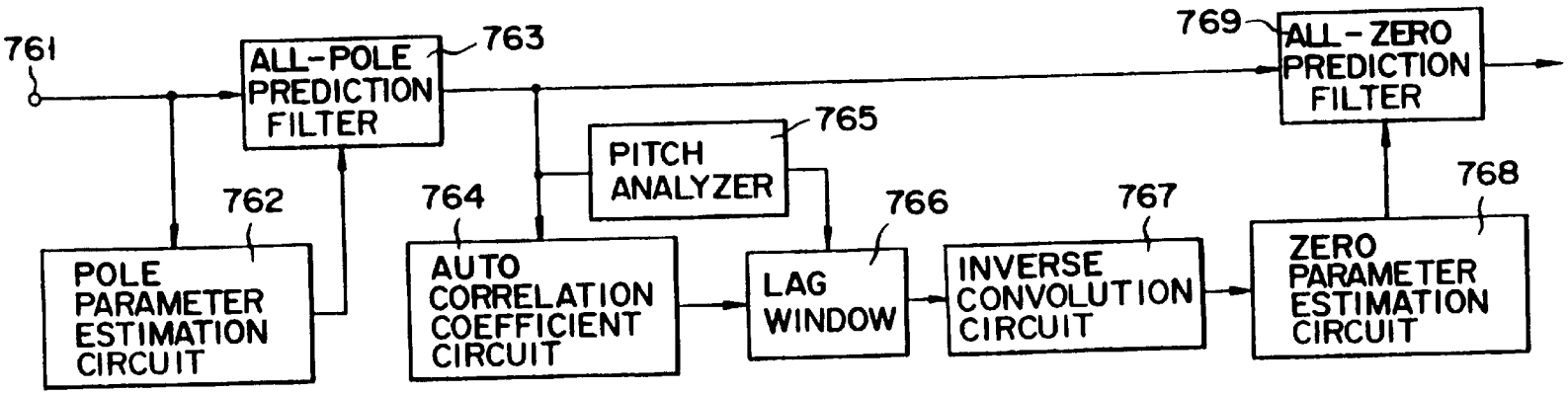

FIGS. 35 and 36 present block diagrams in a case of executing transform of zero points and smoothing in the time domain. In these diagrams, inverse convolution circuits 757 and 767 serve to calculate the equation (69) to solve the equation (68) for $\gamma'(n)$.

Referring to FIG. 36, instead of using the inverse convolution circuit 767, there may be a method of subjecting the output of a lag window 766 to FFT or DFT processing to provide the inverse square (1/1·1hu 2) of the absolute value, then subjecting it to the inverse FFT or inverse DFT processing. In this case, there is an effect of further reducing the amount of calculation compared with the case involving the inverse convolution.

As described above, the power spectrum of the residual signal of the full polar model or the inverse of the power spectrum is smoothed, an autocorrelation coefficient is acquired from the inverse of the smoothed power spectrum through the inverse Fourier transform, the analysis of the full polar model is applied to the acquired autocorrelation coefficient to extract zero point parameters, and the degree of the smoothing is adaptively changed in accordance with the value of the pitch period, whereby smoothing the spectrum can always executed well regardless of who generates a sound or reverberation, and false zero points or too-emphasized zero points caused by the fine structure can be removed. Further, making the filter used for the smoothing have a zero phase can prevent a problem of deviating the zero points of the spectrum due to the phase characteristic of the filter, thus providing a zero pole model which well approximates the spectrum of a voice sound.

INDUSTRIAL APPLICABILITY

As described above, according to the present invention, the pulse interval of the excitation signal is changed subframe by subframe in such a manner that it becomes dense for those subframes containing important information or many pieces of information and becomes sparse for the other subframes, thus presenting an effect of improving the quality of a synthesized signal.

We claim:

1. A speech coding apparatus, comprising:

prediction filter means for producing a prediction residual signal in accordance with a prediction parameter and an input speech signal;

means for generating excitation pulses;

synthesis filter means for outputting a synthesized input speech signal based on the excitation pulses and the prediction parameter;

means for coding an amplitude and an interval of the excitation pulses and the prediction parameter;

in which said excitation pulse generating means comprises:

means for obtaining an error signal between the input speech signal and the synthesized input speech signal;

means for dividing a frame of the prediction residual signal for a predetermined time interval into subframes of the prediction residual signal, the time interval of the subframe being shorter than the time interval of the frame;

means for calculating a square sum of the prediction residual signal for each subframe; and means for calculating a square sum of the error signal for each subframe; and means for controlling said excitation pulse generating means such that the interval of the excitation pulses in each subframe is in accordance with the square sum of the prediction residual signal and the amplitude of the excitation pulses in the subframe is set so as to minimize the square sum of the error signal.

2. A speech coding apparatus according to claim 1, wherein said controlling means comprises mean for setting a short interval of the excitation pulses in the subframe if the square sum of the prediction residual signal has a large value and for setting a large interval of the excitation pulses in the subframe if the square sum of the prediction residual signal has a small value.

3. A speech coding apparatus according to claim 1, wherein said coding means comprises means for coding a pattern of the intervals of the excitation pulses for one frame.

4. A speech coding apparatus according to claim 1, wherein said prediction filter means comprises a linear prediction filter for eliminating short term correlation.

5. A speech coding apparatus according to claim 1, wherein said prediction filter means comprises a cascade connection of a linear prediction filter for eliminating correlation and a pitch-prediction filter for eliminating long term correlation.

6. A speech coding apparatus according to claim 1, wherein said prediction filter means and synthesis filter means comprise a prediction filter of a full pole model.

7. A speech coding apparatus according to claim 1, wherein said prediction filter means and synthesis filter means comprise a prediction filter of a zero pole model.

8. A speech coding apparatus according to claim 1, wherein said prediction filter means and synthesis filter means comprise a cascade connection of a long-term prediction filter and a short-term prediction filter.

9. A speech decoding apparatus which is adapted for decoding a code which is output from the speech coding apparatus according to claim 1, comprising:

means for decoding the amplitude and the interval of the excitation pulses and the prediction parameter;

means for generating the excitation pulses having the amplitude and the interval obtained by said decoding means; and means for synthesizing an input speech signal based on the excitation pulses and the prediction parameter obtained by said decoding means.

10. A speech coding apparatus comprising:

prediction filter means for producing a short-term prediction residual signal in accordance with a prediction parameter and an input speech signal;

means for generating excitation pulses;

synthesis filter means for outputting a synthesis input speech signal based on the excitation pulses and the prediction parameter; and means for coding an amplitude and an interval of the excitation pulses and the prediction parameter;

in which said excitation pulse generating means comprises:

means for obtaining an error signal between the input speech signal and the synthesized input speech signal;

means for dividing a frame of the prediction residual signal for a predetermined time interval into subframes of the prediction residual signal, the time interval of the subframe being shorter than the time interval of the frame;

means for counting a zero-crossing number of the short-term prediction residual signal for each subframe;

means for calculating a square sum of the error signal for each subframe; and means for controlling said excitation pulse generating means such that the interval of the excitation pulses in each subframe is in accordance with the zero-crossing number of the short-term prediction residual signal and the amplitude of the excitation pulses in the subframe is set so as to minimize the square sum of the error signal.

[11. A speech coding apparatus comprising:

prediction filter means for producing a prediction residual signal in accordance with a prediction parameter and an input speech signal;

means for generating excitation pulses;

synthesis filter means for outputting a synthesized input speech signal based on the excitation pulses and the prediction parameter; and means for coding an amplitude and an interval of the excitation pulses and the prediction parameter;

in which said excitation pulse generating means comprises:

means for obtaining an error signal between the input speech signal and the synthesized input speech signal;

means for dividing a frame of the prediction residual signal for a predetermined time interval into subframes of the prediction residual signal, the time interval of the subframe being shorter than the time interval of the frame;

means for calculating a pitch prediction residual signal;

means for calculating a square sum of the pitch prediction residual signal for each subframe;

means for calculating a square sum of the error signal for each subframe; and means for controlling said excitation pulse generating means such that the interval of the excitation pulses in each subframe is in accordance with the zero-crossing number of the short-term prediction residual signal and the amplitude of the excitation pulses in the subframe is set so as to minimize the square sum of the error signal.]

12. A speech coding apparatus comprising:

prediction filter means for producing a short-term prediction residual signal in accordance with a prediction parameter and an input speech signal;

means for generating excitation pulses;

synthesis filter means for outputting a synthesized input speech signal based on the excitation pulses and the prediction parameter; and means for coding an amplitude and an interval of the excitation pulses and the prediction parameter;

in which said excitation pulse generating means comprises:

means for obtaining an error signal between the input speech signal and the synthesized input speech signal;

means for dividing a frame of the prediction residual signal for a predetermined time interval into subframes of the prediction residual signal, the time interval of the subframe being shorter than the time interval of the frame;

means for calculating a pitch prediction residual signal; means for counting a zero-crossing number of the pitch prediction residual prediction residual signal for each subframe;

means for calculating a square sum of the error signal for each subframe; and means for controlling said excitation pulse generating means such that the interval of the excitation pulses in each subframe is in accordance with the zero-crossing number of the short-term prediction residual signal and the amplitude of the excitation pulses in the subframe is set so as to minimize the square sum of the error signal.

*13. A speech coding apparatus, comprising:*

*prediction filter means for producing a prediction residual signal in accordance with a prediction parameter and an input speech signal;*

*excitation pulse generating means;*

*synthesis filter means for outputting a synthesized input speech signal based on the excitation pulses and the prediction parameter; and*

*means for coding an amplitude and a density of the excitation pulses and the prediction parameter, in which said excitation pulse generating means comprises:*

*means for obtaining an error signal between the input speech signal and the synthesized input speech signal;*

*means for dividing a frame of the prediction residual signal having a predetermined time into subframes of the prediction residual signal, each of the subframes of the prediction residual signal having a subframe time interval, the subframe time interval of each of the subframes being shorter than the time interval of the frame;*

*means for calculating a square sum of the prediction residual signal for each subframe; and*

*means for calculating a square sum of the error signal for each subframe; and*

*means for controlling said excitation pulse generating means such that the density of the excitation pulses in each subframe is in accordance with the square sum of the prediction residual signal and the amplitude of the excitation pulses in the subframe is set so as to minimize the square sum of the error signal.*

*14. A speech coding apparatus according to claim 13, wherein said controlling means comprises means for causing the density of the excitation pulses in the subframe to be dense if the square sum of the prediction residual signal has a large value and for causing the density of the excitation pulses in the subframe to be sparse if the square sum of the prediction residual signal has a small value.*

*15. A speech coding apparatus according to claim 13, wherein said coding means comprises means for coding a pattern of the densities of the excitation pulses for one frame.*

*16. A speech coding apparatus according to claim 13, wherein said prediction filter means comprises a linear prediction filter for eliminating short term correlation.*

*17. A speech coding apparatus according to claim 13, wherein said prediction filter means comprises a cascade connection of a linear prediction filter for eliminating correlation and a pitch-prediction filter for eliminating long term correlation.*

*18. A speech coding apparatus according to claim 13, wherein said prediction filter means and said synthesis filter means comprise a prediction filter of a full pole model.*

*19. A speech coding apparatus according to claim 13, wherein said prediction filter means and said synthesis filter means comprise a prediction filter of a zero pole model.*

*20. A speech coding apparatus according to claim 13, wherein said prediction filter means and said synthesis filter means comprise a cascade connection of a long-term prediction filter and a short-term prediction filter.*

*21. A speech decoding apparatus which is adapted for decoding a code which is output from the speech coding apparatus according to claim 13, comprising:*

*means for decoding the amplitude and the density of the excitation pulses and the prediction parameter;*

*means for generating excitation pulses having the amplitude and the density obtained by said decoding means; and*

*means for synthesizing an input speech signal based on the excitation pulses and the prediction parameter obtained by said decoding means.*

*22. A speech coding apparatus comprising:*

*prediction filter means for producing a short-term prediction residual signal in accordance with a prediction parameter and an input speech signal;*

*excitation pulse generating means;*

*synthesis filter means for outputting a synthesized input speech signal based on the excitation pulses and the prediction parameter; and*

*means for coding an amplitude and a density of the excitation pulses and the prediction parameter, in which said excitation pulse generating mean comprises:*

*means for obtaining an error signal between the input speech signal and the synthesized input speech signal;*

*means for dividing a frame of the prediction residual signal having a predetermined time into subframes of the prediction residual signal, each of the subframes of the prediction residual signal having a subframe time interval, the subframe time interval of each of the subframes being shorter than the time interval of the frame:*

*means for counting a number of zero-crossings of the short-term prediction residual signal for each subframe;*

*means for calculating a square sum of the error signal for each subframe; and*

*means for controlling said excitation pulse generating means such that the density of the excitation pulses in each subframe is in accordance with the number of zero-crossings of the short-term prediction residual signal and the amplitude of the excitation pulses in the subframe is set so as to minimize the square sum of the error signal.*

*23. A speech coding apparatus comprising:*

*prediction filter means for producing a prediction residual signal in accordance with a prediction parameter and an input speech signal;*

*excitation pulse generating means;*

*synthesis filter means, for outputting a synthesized input speech signal based on the excitation pulses and the prediction parameter; and*

*means for coding an amplitude and a density of the excitation pulses and the prediction parameter, in which said excitation pulse generating means comprises:*

*means for obtaining an error signal between the input speech signal and the synthesized input speech signal;*

*means for dividing a frame of the prediction residual signal having a predetermined time into subframes of the prediction residual signal, each of the subframes of the prediction residual signal having a subframe time interval, the subframe time interval of each of the subframes being shorter than the time interval of the frame;*

*means for calculating a pitch prediction residual signal;*

*means for calculating a square sum of the pitch prediction residual signal for each subframe;*

*means for calculating a squire sum of the error signal for each subframe; and*

*means for controlling said excitation pulse generating means such that the density of the excitation pulses in each subframe is in accordance with the square sum of the ditch prediction residual signal and the amplitude of the excitation pulses in the subframe is set so as to minimize the square sum of the error signal.*

*24. A speech coding apparatus comprising:*

*prediction filter means for producing a short-term prediction residual signal in accordance with a prediction parameter and an input speech signal;*

*excitation pulse generating means;*

*synthesis filter means for outputting a synthesized input speech signal based on the excitation pulses and the prediction parameter; and*

*means for coding an amplitude and a density of the excitation pulses and the prediction parameter, in which said excitation pulse generating means comprises:*

*means for obtaining an error signal between the input speech signal and the synthesized input speech signal;*

*means for dividing a frame of the prediction residual signal having a predetermined time into subframes of the prediction residual signal, each of the subframes of the prediction residual signal having a subframe time interval, the subframe time interval of each of the subframes being shorter than the time interval of the frame;*

*means for calculating a pitch prediction residual signal;*

*means for counting a number of zero-crossings of the pitch prediction residual signal for each subframe;*

*means for calculating a square sum of the error signal for each subframe; and*

*means for controlling said excitation pulse generating means such that the density of the excitation pulses in each subframe is in accordance with the number of zero crossings of the short-term prediction residual signal and the amplitude of the excitation pulses in the subframe is set so as to minimize the square sum of the error signal.*

*25. A speech coding apparatus comprising:*

*a prediction parameter calculator for generating a prediction parameter based on an input speech;*

*an excitation pulse generator for generating excitation pulses;*

*a synthesis filter for generating a synthesized input speech based on the excitation pulses and the prediction parameter;*

*a subtracter for calculating a difference between the input speech and the synthesized input speech;*

*a controller for controlling said excitation pulse generator based on the input speech and said difference, such that density of the excitation pulses is varied in accordance with an amount of information contained in the input speech and an amplitude of the excitation pulses is set so as to minimize the difference; and*

*means for coding the excitation pulses.*

*26. A speech coding apparatus according to claim 25, wherein said controller comprises:*

*a prediction filter for producing a prediction residual signal in accordance with the prediction parameter and the input speech;*

*a divider for dividing a frame of the prediction residual signal having a predetermined time interval into subframes of the prediction residual signal, each of the subframes of the prediction residual signal having a subframe time interval, the subframe time interval of each of the subframes being shorter than the time interval of the frame;*

*a calculator for calculating a square sum of the prediction residual signal for each subframe; and*

*means for controlling the density of the excitation pulses in each subframe in accordance with the square sum of the prediction residual signal.*

*27. A speech coding apparatus according to claim 25, wherein said controller comprises:*

*a prediction filter for producing a short-term prediction residual signal in accordance with the prediction parameter and the input speech;*

*a divider for dividing a frame of the prediction residual signal for a predetermined time interval into subframes of the prediction residual signal, each of the subframes of the prediction residual signal having a subframe time interval, the time interval of each of the subframes being shorter than the time interval of the frame;*

*a counter for counting a number zero crossings of the short-term prediction residual signal for each subframe:*

*means for controlling the density of the excitation pulses in each subframe in accordance with the number of zero crossings of the short-term prediction residual signal.*

*28. A speech coding apparatus according to claim 25, wherein said controller comprises:*

*a prediction filter for producing a prediction residual signal in accordance with the prediction parameter and the input speech;*

*a divider for dividing a frame of the prediction residual signal for a predetermined time into subframes of the prediction residual signal, each of the subframes of the prediction residual signal having a subframe time interval, the subframe time interval of each of the subframes being shorter than the time interval of the frame;*

*a first calculator for calculating a pitch prediction residual signal;*

*a second calculator for calculating a square sum of the pitch prediction residual signal: and*

*means for controlling the density of the excitation pulses in each subframe in accordance with the square sum of the pitch prediction residual signal.*

*29. A speech coding apparatus according to claim 25, wherein said controller comprises:*

*a prediction filter for producing a short-term prediction residual signal in accordance with the prediction parameter and the input speech;*

*a divider for dividing a frame of the prediction residual signal for a predetermined time interval into subframes of the prediction residual signal, the time interval of the subframe being shorter than the time interval of the frame;*

*a calculator for calculating a pitch prediction residual signal;*

*a counter for counting a number of zero crossings of the pitch prediction residual signal for each subframe; and*

*means for controlling the density of the excitation pulses in each subframe in accordance with the number of zero crossings of the short-term prediction residual signal.*

*30. A speech coding apparatus comprising:*

*a prediction parameter calculator for generating a prediction parameter based on an input speech;*

*an excitation pulse generator for generating excitation pulses;*

*a synthesis filter for generating a synthesized input speech based on the excitation pulses and the prediction parameter;*

*a subtracter for calculating a difference between the input speech and the synthesized input speech;*

*a controller for controlling said excitation pulse generator based on the input speech and said difference, such that density of the excitation pulses is varied in accordance with an importance of information contained in the input speech and an amplitude of the excitation pulses is set so as to minimize the difference; and*

*means for coding the excitation pulses.*

*31. A speech coding apparatus according to claim 30, wherein said controller comprises:*

*a prediction filter for producing a prediction residual signal in accordance with the prediction parameter and the input speech;*

*a divider for dividing a frame of the prediction residual signal for a predetermined time interval into subframes of the prediction residual signal, each of the subframes of the prediction residual signal having a subframe time interval, the subframe time interval of each of the subframe being shorter than the time interval of the frames;*

*a calculator for calculating a square sum of the prediction residual signal for each subframe; and*

*means for controlling the density of the excitation pulses in each subframe in accordance with the square sum of the prediction residual signal.*

*32. A speech coding apparatus according to claim 30, wherein said controller comprises:*

*a prediction filter for producing a short-term prediction residual signal in accordance with the prediction parameter and the input speech;*

*a divider for dividing a frame of the prediction residual signal having a predetermined time interval into subframes of the prediction residual signal, each of the subframes of the prediction residual signal having a subframe time interval, the subframe time interval of each of the subframes being shorter than the time interval of the frame;*

*a counter for counting a number of zero crossings of the short-term prediction residual signal for each subframe;*

*means for controlling the density of the excitation pulses in each subframe in accordance with the number of zero crossings of the short-term prediction residual signal.*

*33. A speech coding apparatus according to claim 30, wherein said controller comprises;*

*a prediction filter for producing a prediction residual signal in accordance with the prediction parameter and the input speech;*

*a divider for dividing a frame of the prediction residual signal for a predetermined time into subframes of the prediction residual signal, each of the subframes of the prediction residual signal having a subframe time interval, the subframe time interval of each of the subframes being shorter than the time interval of the frame;*

*a first calculator for calculating a pitch prediction residual signal;*

*a second calculator for calculating a square sum of the pitch prediction residual signal; and*

*means for controlling the density of the excitation pulses in each subframe in accordance with the square sum of the pitch prediction residual signal.*

*34. A speech coding apparatus according to claim 30, wherein said controller comprises:*

*a prediction filter for producing a short-term prediction residual signal in accordance with the prediction parameter and the input speech;*

*a divider for dividing a frame of the prediction residual signal for a predetermined time interval into subframes of the prediction residual signal, each of the subframes of the prediction residual signal having a subframe time interval, the subframe time interval of each of the subframes being shorter than the time interval of the frame;*

*a calculator for calculating a pitch prediction residual signal;*

*a counter for counting a number of zero crossings of the pitch prediction residual signal for each subframe; and*

*means for controlling the density of the excitation pulses in each subframe in accordance with the number of zero crossings of the short-term prediction residual signal.*

*35. A speech coding method comprising the following steps of:*

*generating a prediction parameter based on an input speech;*

*generating excitation pulses;*

*generating a synthesized input speech based on the excitation pulses and the prediction parameter;*

*calculating a difference between the input speech and the synthesized input speech;*

*controlling generation of said excitation pulses based on the input speech and said difference such that density of the excitation pulses is varied in accordance with an amount of information contained in the input speech and an amplitude of the excitation pulses is set so as to minimize the difference; and*

*coding the excitation pulses.*

*36. A speech coding method comprising the following steps of:*

*generating a prediction parameter based on an input speech;*

*generating excitation pulses;*

*generating a synthesized input speech based on the excitation pulses and the prediction parameter;*

*calculating a difference between the input speech and the synthesized input speech;*

*controlling generation of said excitation pulses based on the input speech and said difference such that density of the excitation pulses is varied in accordance with an importance amount of information contained in the input speech and an amplitude of the excitation pulses is set so as to minimize the difference; and*

*coding the excitation pulses.*

*37. A speech coding apparatus comprising:*

*prediction filter means, for producing a prediction residual signal in accordance with a prediction parameter and an input speech signal;*

*excitation pulse generating means;*

*synthesis filter means, for outputting a synthesized input speech signal based on the excitation pulses and the prediction parameter; and*

*means for coding an amplitude and an interval of the excitation pulses and the prediction parameter, in which said excitation pulse generating means comprises:*

*means for obtaining an error signal between the input speech signal and the synthesized input speech signal;*

*means for dividing a frame of the prediction residual signal having a predetermined time into subframes of the prediction residual signal, each of the subframes of the prediction residual signal having a subframe time interval, the subframe time interval of each of the subframes being shorter than the time interval of the frame;*

*means for calculating a pitch prediction residual signal;*

*means for calculating a square sum of the pitch prediction residual signal for each subframe:*

*means for calculating a square sum of the error signal for each subframe; and*

*means for controlling said excitation pulse generating means such that the interval of the excitation pulses in each subframe is in accordance with the square sum of the pitch prediction residual signal and the amplitude of the excitation pulses in the subframe is set so as to minimize the square sum of the error signal.*

* * * * *